(12) United States Patent
Miranker et al.

(10) Patent No.: US 10,860,653 B2
(45) Date of Patent: *Dec. 8, 2020

(54) SYSTEM FOR ACCESSING A RELATIONAL DATABASE USING SEMANTIC QUERIES

(71) Applicant: data.world, Inc., Austin, TX (US)

(72) Inventors: Daniel Paul Miranker, Austin, TX (US); Juan Federico Sequeda, Austin, TX (US)

(73) Assignee: data.world, Inc., Austin, TX (US)

( * ) Notice: Subject to any disclaimer, the term of this patent is extended or adjusted under 35 U.S.C. 154(b) by 111 days.

This patent is subject to a terminal disclaimer.

(21) Appl. No.: 16/251,408

(22) Filed: Jan. 18, 2019

(65) Prior Publication Data
US 2019/0155852 A1    May 23, 2019

Related U.S. Application Data

(63) Continuation of application No. 15/165,775, filed on May 26, 2016, now Pat. No. 10,216,860, which is a
(Continued)

(51) Int. Cl.
*G06F 16/00* (2019.01)
*G06F 16/9032* (2019.01)
(Continued)

(52) U.S. Cl.
CPC ........ *G06F 16/90332* (2019.01); *G06F 16/25* (2019.01); *G06F 16/353* (2019.01);
(Continued)

(58) Field of Classification Search
CPC .... G06F 16/90332; G06F 16/25; G06F 16/81; G06F 16/86; G06F 16/353; G06F 16/8358; G06F 16/8365
See application file for complete search history.

(56) References Cited

U.S. PATENT DOCUMENTS 6,144,962 A    11/2000 Weinberg et al.
6,317,752 B1   11/2001 Lee et al.
(Continued)

FOREIGN PATENT DOCUMENTS

CA    2820994 A1    1/2014
CN    103425734 B    6/2017
(Continued)

OTHER PUBLICATIONS

"Data.World Comes Out of Stealth to Make Open Data Easier." Americaninno.com, AustinInn, Jul. 11, 2016, www.americaninno.com/austin/open-data-tech-brett-hurts-startup-data-world-launches/.
(Continued)

*Primary Examiner* — Alexander Khong
(74) *Attorney, Agent, or Firm* — Kokka & Backus, PC

(57) ABSTRACT

This invention is a system for integrating data sets organized in one organization type with data sets organized in a second organization type so that data queries submitted to be processed in the manner of the first organization type can be translated into queries usable by the data set in the second data organization type and the results returned to satisfy the first query.

3 Claims, 18 Drawing Sheets

Related U.S. Application Data continuation of application No. 14/220,526, filed on Mar. 20, 2014, now Pat. No. 9,396,283, which is a continuation of application No. 13/278,907, filed on Oct. 21, 2011, now Pat. No. 8,719,252.

(60) Provisional application No. 61/406,021, filed on Oct. 22, 2010.

(51) Int. Cl.
| | |
|---|---|
| G06F 16/25 | (2019.01) |
| G06F 16/81 | (2019.01) |
| G06F 16/84 | (2019.01) |
| G06F 16/35 | (2019.01) |
| G06F 16/835 | (2019.01) |

(52) U.S. Cl.
CPC .......... *G06F 16/81* (2019.01); *G06F 16/8358* (2019.01); *G06F 16/8365* (2019.01); *G06F 16/86* (2019.01)

(56) References Cited

U.S. PATENT DOCUMENTS

| | | | |
|---|---|---|---|
| 6,529,909 | B1 | 3/2003 | Bowman-Amuah |
| 6,768,986 | B2 | 7/2004 | Cras et al. |
| 6,961,728 | B2 | 11/2005 | Wynblatt et al. |
| 7,080,090 | B2 | 7/2006 | Shah et al. |
| 7,146,375 | B2 | 12/2006 | Egilsson et al. |
| 7,680,862 | B2 | 3/2010 | Chong et al. |
| 7,761,407 | B1 | 7/2010 | Stern |
| 7,836,063 | B2 | 11/2010 | Salazar et al. |
| 7,853,081 | B2 | 12/2010 | Thint |
| 7,856,416 | B2 | 12/2010 | Hoffman et al. |
| 7,877,350 | B2 | 1/2011 | Stanfill et al. |
| 7,953,695 | B2 | 5/2011 | Roller et al. |
| 7,987,179 | B2 | 7/2011 | Ma et al. |
| 8,037,108 | B1 | 10/2011 | Chang |
| 8,060,472 | B2 | 11/2011 | Itai et al. |
| 8,099,382 | B2 | 1/2012 | Liu et al. |
| 8,170,981 | B1 | 5/2012 | Tewksbary |
| 8,275,784 | B2 | 9/2012 | Cao et al. |
| 8,429,179 | B1 | 4/2013 | Mirhaji |
| 8,521,565 | B2 | 8/2013 | Faulkner et al. |
| 8,538,985 | B2 | 9/2013 | Betawadkar-Norwood et al. |
| 8,583,631 | B1 | 11/2013 | Ganapathi et al. |
| 8,616,443 | B2 | 12/2013 | Butt et al. |
| 8,719,252 | B2 | 5/2014 | Miranker et al. |
| 8,762,160 | B2 | 6/2014 | Lulla |
| 8,799,240 | B2 | 8/2014 | Stowe et al. |
| 8,831,070 | B2 | 9/2014 | Huang et al. |
| 8,843,502 | B2 | 9/2014 | Elson et al. |
| 8,892,513 | B2 | 11/2014 | Forsythe |
| 8,935,272 | B2 | 1/2015 | Ganti et al. |
| 8,943,313 | B2 | 1/2015 | Glew et al. |
| 8,965,915 | B2 | 2/2015 | Ganti et al. |
| 8,990,236 | B2 | 3/2015 | Mizrahy et al. |
| 8,996,559 | B2 | 3/2015 | Ganti et al. |
| 9,002,860 | B1 | 4/2015 | Ghemawat |
| 9,218,365 | B2 | 12/2015 | Irani et al. |
| 9,244,952 | B2 | 1/2016 | Ganti et al. |
| 9,396,283 | B2 | 7/2016 | Miranker et al. |
| 9,495,429 | B2 | 11/2016 | Miranker |
| 9,607,042 | B2 | 3/2017 | Long |
| 9,690,792 | B2 | 6/2017 | Bartlett et al. |
| 9,696,981 | B2 | 7/2017 | Martin et al. |
| 9,710,526 | B2 | 7/2017 | Couris et al. |
| 9,710,568 | B2 | 7/2017 | Srinivasan et al. |
| 9,720,958 | B2 | 8/2017 | Bagehorn et al. |
| 9,798,737 | B2 | 10/2017 | Palmer |
| 10,102,258 | B2 | 10/2018 | Jacob et al. |
| 10,176,234 | B2 | 1/2019 | Gould et al. |
| 10,216,860 | B2 | 2/2019 | Miranker et al. |
| 10,324,925 | B2 | 6/2019 | Jacob et al. |
| 10,346,429 | B2 | 7/2019 | Jacob et al. |
| 10,353,911 | B2 | 7/2019 | Reynolds et al. |
| 10,438,013 | B2 | 10/2019 | Jacob et al. |
| 10,452,677 | B2 | 10/2019 | Jacob et al. |
| 10,452,975 | B2 | 10/2019 | Jacob et al. |
| 2002/0143755 | A1 | 10/2002 | Wynblatt et al. |
| 2003/0093597 | A1 | 5/2003 | Marshak et al. |
| 2003/0120681 | A1 | 6/2003 | Baclawski |
| 2003/0208506 | A1 | 11/2003 | Greenfield et al. |
| 2004/0064456 | A1 | 4/2004 | Fong et al. |
| 2005/0010550 | A1 | 1/2005 | Potter et al. |
| 2005/0010566 | A1 | 1/2005 | Cushing et al. |
| 2005/0234957 | A1 | 10/2005 | Olson et al. |
| 2005/0246357 | A1 | 11/2005 | Geary et al. |
| 2005/0278139 | A1 | 12/2005 | Glaenzer et al. |
| 2006/0129605 | A1 | 6/2006 | Doshi |
| 2006/0168002 | A1 | 7/2006 | Chesley |
| 2006/0218024 | A1 | 9/2006 | Lulla |
| 2006/0235837 | A1 | 10/2006 | Chong et al. |
| 2007/0027904 | A1 | 2/2007 | Chow et al. |
| 2007/0179760 | A1 | 8/2007 | Smith |
| 2007/0203933 | A1 | 8/2007 | Iversen et al. |
| 2008/0046427 | A1 | 2/2008 | Lee et al. |
| 2008/0091634 | A1 | 4/2008 | Seeman |
| 2008/0162550 | A1 | 7/2008 | Fey |
| 2008/0162999 | A1 | 7/2008 | Schlueter et al. |
| 2008/0216060 | A1 | 9/2008 | Vargas |
| 2008/0240566 | A1 | 10/2008 | Thint |
| 2008/0256026 | A1 | 10/2008 | Hays |
| 2008/0294996 | A1 | 11/2008 | Hunt et al. |
| 2008/0319829 | A1 | 12/2008 | Hunt et al. |
| 2009/0006156 | A1 | 1/2009 | Hunt et al. |
| 2009/0018996 | A1 | 1/2009 | Hunt et al. |
| 2009/0106734 | A1 | 4/2009 | Riesen et al. |
| 2009/0132474 | A1 | 5/2009 | Ma et al. |
| 2009/0132503 | A1 | 5/2009 | Sun et al. |
| 2009/0138437 | A1 | 5/2009 | Krishnamoorthy et al. |
| 2009/0150313 | A1 | 6/2009 | Heilper et al. |
| 2009/0157630 | A1 | 6/2009 | Yuan |
| 2009/0182710 | A1 | 7/2009 | Short et al. |
| 2009/0234799 | A1 | 9/2009 | Betawadkar-Norwood et al. |
| 2009/0300054 | A1 | 12/2009 | Fisher et al. |
| 2010/0114885 | A1 | 5/2010 | Bowers et al. |
| 2010/0235384 | A1 | 9/2010 | Itai et al. |
| 2010/0241644 | A1* | 9/2010 | Jackson .............. G06F 16/2452 707/760 |
| 2010/0250576 | A1 | 9/2010 | Bowers et al. |
| 2010/0250577 | A1 | 9/2010 | Cao et al. |
| 2011/0202560 | A1* | 8/2011 | Bowers .................. G06F 16/20 707/773 |
| 2012/0016895 | A1 | 1/2012 | Butt et al. |
| 2012/0036162 | A1 | 2/2012 | Gimbel |
| 2012/0102022 | A1 | 4/2012 | Miranker et al. |
| 2012/0154633 | A1 | 6/2012 | Rodriguez |
| 2012/0179644 | A1 | 7/2012 | Miranker |
| 2012/0254192 | A1 | 10/2012 | Gelbard |
| 2012/0278902 | A1 | 11/2012 | Martin et al. |
| 2012/0284301 | A1 | 11/2012 | Mizrahy et al. |
| 2012/0310674 | A1 | 12/2012 | Faulkner et al. |
| 2012/0330908 | A1 | 12/2012 | Stowe et al. |
| 2012/0330979 | A1 | 12/2012 | Elson et al. |
| 2013/0031208 | A1 | 1/2013 | Linton et al. |
| 2013/0031364 | A1 | 1/2013 | Glew et al. |
| 2013/0110775 | A1 | 5/2013 | Forsythe |
| 2013/0114645 | A1 | 5/2013 | Huang et al. |
| 2013/0138681 | A1 | 5/2013 | Abrams et al. |
| 2013/0156348 | A1 | 6/2013 | Irani et al. |
| 2013/0238667 | A1 | 9/2013 | Carvalho et al. |
| 2013/0262443 | A1 | 10/2013 | Leida et al. |
| 2014/0006448 | A1 | 1/2014 | McCall |
| 2014/0019426 | A1 | 1/2014 | Palmer |
| 2014/0067762 | A1 | 3/2014 | Carvalho |
| 2014/0198097 | A1 | 7/2014 | Evans |
| 2014/0214857 | A1 | 7/2014 | Srinivasan et al. |
| 2014/0279640 | A1 | 9/2014 | Moreno et al. |
| 2014/0279845 | A1 | 9/2014 | Ganti et al. |
| 2014/0280067 | A1 | 9/2014 | Ganti et al. |
| 2014/0280286 | A1 | 9/2014 | Ganti et al. |
| 2014/0280287 | A1 | 9/2014 | Ganti et al. |
| 2014/0337331 | A1 | 11/2014 | Hassanzadeh et al. |

(56) References Cited

U.S. PATENT DOCUMENTS

| | | |
|---|---|---|
| 2015/0052125 A1 | 2/2015 | Ellis et al. |
| 2015/0081666 A1 | 3/2015 | Long |
| 2015/0095391 A1 | 4/2015 | Gajjar et al. |
| 2015/0120643 A1 | 4/2015 | Dantressangle et al. |
| 2015/0142829 A1 | 5/2015 | Lee et al. |
| 2015/0186653 A1 | 7/2015 | Gkoulalas-Divanis et al. |
| 2015/0213109 A1 | 7/2015 | Kassko et al. |
| 2015/0234884 A1 | 8/2015 | Henriksen |
| 2015/0269223 A1 | 9/2015 | Miranker et al. |
| 2016/0055184 A1 | 2/2016 | Fokoue-Nkoutche et al. |
| 2016/0063017 A1 | 3/2016 | Bartlett et al. |
| 2016/0092090 A1 | 3/2016 | Stojanovic et al. |
| 2016/0092474 A1 | 3/2016 | Stojanovic et al. |
| 2016/0092475 A1 | 3/2016 | Stojanovic et al. |
| 2016/0117362 A1 | 4/2016 | Bagehorn et al. |
| 2016/0132572 A1 | 5/2016 | Chang et al. |
| 2016/0147837 A1 | 5/2016 | Nguyen et al. |
| 2016/0232457 A1 | 8/2016 | Gray et al. |
| 2016/0275204 A1 | 9/2016 | Miranker et al. |
| 2016/0283551 A1 | 9/2016 | Fokoue-Nkoutche et al. |
| 2016/0292206 A1 | 10/2016 | Velazquez et al. |
| 2016/0314143 A1 | 10/2016 | Hiroshige |
| 2016/0321316 A1 | 11/2016 | Pennefather et al. |
| 2016/0322082 A1 | 11/2016 | Davis et al. |
| 2016/0371355 A1 | 12/2016 | Massari et al. |
| 2017/0053130 A1 | 2/2017 | Hughes et al. |
| 2017/0075973 A1 | 3/2017 | Miranker |
| 2017/0132401 A1 | 5/2017 | Gopi et al. |
| 2017/0161323 A1 | 6/2017 | Simitsis et al. |
| 2017/0177729 A1 | 6/2017 | Duke et al. |
| 2017/0228405 A1 | 8/2017 | Ward et al. |
| 2017/0316070 A1 | 11/2017 | Krishnan et al. |
| 2017/0357653 A1 | 12/2017 | Bicer et al. |
| 2017/0364538 A1 | 12/2017 | Jacob et al. |
| 2017/0364539 A1 | 12/2017 | Jacob et al. |
| 2017/0364553 A1 | 12/2017 | Jacob et al. |
| 2017/0364564 A1 | 12/2017 | Jacob et al. |
| 2017/0364568 A1 | 12/2017 | Reynolds et al. |
| 2017/0364569 A1 | 12/2017 | Jacob et al. |
| 2017/0364570 A1 | 12/2017 | Jacob et al. |
| 2017/0364694 A1 | 12/2017 | Jacob et al. |
| 2017/0364703 A1 | 12/2017 | Jacob et al. |
| 2017/0371881 A1 | 12/2017 | Reynolds et al. |
| 2018/0025027 A1 | 1/2018 | Palmer |
| 2018/0032327 A1 | 2/2018 | Adami et al. |
| 2018/0210936 A1 | 7/2018 | Reynolds et al. |
| 2018/0262864 A1 | 9/2018 | Reynolds et al. |
| 2018/0314705 A1 | 11/2018 | Griffith et al. |
| 2019/0005104 A1 | 1/2019 | Prabhu et al. |
| 2019/0034491 A1 | 1/2019 | Griffith et al. |
| 2019/0042606 A1 | 2/2019 | Griffith et al. |
| 2019/0050445 A1 | 2/2019 | Griffith et al. |
| 2019/0050459 A1 | 2/2019 | Griffith et al. |
| 2019/0065567 A1 | 2/2019 | Griffith et al. |
| 2019/0065569 A1 | 2/2019 | Boutros et al. |
| 2019/0066052 A1 | 2/2019 | Boutros et al. |
| 2019/0079968 A1 | 3/2019 | Griffith et al. |
| 2019/0095472 A1 | 3/2019 | Griffith |
| 2019/0121807 A1 | 4/2019 | Boutros et al. |
| 2019/0266155 A1 | 8/2019 | Jacob et al. |
| 2019/0272279 A1 | 9/2019 | Jacob et al. |
| 2019/0317961 A1 | 10/2019 | Brener et al. |
| 2019/0347244 A1 | 11/2019 | Jacob et al. |
| 2019/0347258 A1 | 11/2019 | Jacob et al. |
| 2019/0347259 A1 | 11/2019 | Jacob et al. |
| 2019/0347268 A1 | 11/2019 | Griffith |
| 2019/0347347 A1 | 11/2019 | Griffith |
| 2019/0370230 A1 | 12/2019 | Jacob et al. |
| 2019/0370262 A1 | 12/2019 | Reynolds et al. |
| 2019/0370266 A1 | 12/2019 | Jacob et al. |
| 2019/0370481 A1 | 12/2019 | Jacob et al. |
| 2020/0073865 A1 | 3/2020 | Jacob et al. |
| 2020/0074298 A1 | 3/2020 | Jacob et al. |
| 2020/0097504 A1 | 3/2020 | Sequeda et al. |

FOREIGN PATENT DOCUMENTS

| | | |
|---|---|---|
| EP | 2631817 A1 | 8/2013 |
| EP | 2631819 A1 | 8/2013 |
| EP | 2685394 A3 | 6/2017 |
| GB | 2519779 A | 5/2015 |
| JP | 2013175181 A | 9/2013 |
| JP | 2013246828 A | 12/2013 |
| WO | 2012054860 A1 | 4/2012 |
| WO | 2017190153 A1 | 11/2017 |
| WO | 2017222927 A1 | 12/2017 |
| WO | 2018156551 A1 | 8/2018 |
| WO | 2018164971 A1 | 9/2018 |

OTHER PUBLICATIONS

Dwivedi, Mahesh H., Non-Final Office Action dated Jan. 30, 2020 for U.S. Appl. No. 15/454,955.
Gillin, Paul, "Neo4j Connector Integrates Graph Data With Business Intelligence Tools," SiliconANGLE, Published Mar. 24, 2020, Retrieved from on Mar. 25, 2020.
Hu, Xiaoqin, Final Office Action dated Oct. 31, 2019 for U.S. Appl. No. 15/454,969.
Hu, Xiaoqin, Final Office Action dated Sep. 24, 2019 for U.S. Appl. No. 15/454,981.
Yen, Syling, Final Office Action dated Oct. 25, 2019 for U.S. Appl. No. 15/186,519.
Yotova, Polina, Supplementary European Search Report and Examiner Search Opinion for European Patent Application No. 17815970.3, dated Feb. 21, 2020.
Angles, R., Gutierrez. C., "The Expressive Power of SPARQL," Proceedings of the 7th International Semantic Web Conference (ISWC2008). 2008.
Arenas, M., et al., "A Direct Mapping of Relational Data to RDF," W3C Recommendation, Sep. 27, 2012, Retrieved from the Internet [retrieved Mar. 7, 2019].
Beckett, D., Berners-Lee, T., "Turtle—Terse RDF Triple Language," W3C Team Submission, Jan. 14, 2008, Retrieved from the Internet [retrieved Mar. 7, 2019].
Beckett, D., Broekstra, J., "SPARQL Query Results XML Format," W3C Recommendation, Jan. 15, 2008, Retrieved from the Internet [retrieved Mar. 7, 2019].
Beckett, Dave, "RDF/XML Syntax Specification (Revised)," W3C Recommendation, Feb. 10, 2004, Retrieved from the Internet [retrieved Mar. 7, 2019].
Berners-Lee, Tim, "Notation 3," 2006, Retrieved from the Internet [retrieved on Mar. 7, 2019].
Berners-Lee, Tim, "Linked Data," 2009, Retrieved from the Internet [retrieved on Mar. 7, 2019].
Boutros et al., "Computerized Tools to Develop and Manage Data-Driven Projects Collaboratively Via a Networked Computing Platform and Collaborative Datasets," U.S. Appl. No. 15/985,702, filed May 22, 2018.
Boutros et al., "Computerized Tools to Facilitate Data Project Development Via Data Access Layering Logic in a Networked Computing Platform Including Collaborative Datasets," U.S. Appl. No. 15/985,704, filed May 22, 2018.
Boutros et al., "Dynamic Composite Data Dictionary to Facilitate Data Operations Via Computerized Tools Configured to Access Collaborative Datasets in a Networked Computing Platform," U.S. Appl. No. 15/985,705, filed May 22, 2018.
Boutros et al., "Graphical User Interface for a Display Screen or Portion Thereof," U.S. Appl. No. 29/648,465, filed May 22, 2018.
Boutros et al., "Graphical User Interface for a Display Screen or Portion Thereof," U.S. Appl. No. 29/648,466, filed May 22, 2018.
Boutros et al., "Graphical User Interface for a Display Screen or Portion Thereof," U.S. Appl. No. 29/648,467, filed May 22, 2018.
Brener et al., "Computerized Tools Configured to Determine Subsets of Graph Data Arrangements for Linking Relevant Data to Enrich Datasets Associated With a Data-Driven Collaborative Dataset Platform," U.S. Appl. No. 16/395,036, filed Apr. 25, 2019.

(56) References Cited

OTHER PUBLICATIONS

Brickley, D., Guha, R.V., "RDF Vocabulary Description Language 1.0: RDF Schema," W3C Recommendation, Feb. 10, 2004, Retrieved from the Internet [retrieved Mar. 7, 2019].
Buche et al., "Flexible SPARQL Querying of Web Data Tables Driven by an Ontology," FQAS 2009, LNAI 5822, Springer, 2009, pp. 345-357.
Bullock, Joshua, Final Office Action dated Jan. 22, 2019 for U.S. Appl. No. 15/439,908.
Bullock, Joshua, Final Office Action dated Jan. 22, 2019 for U.S. Appl. No. 15/439,911.
Bullock, Joshua, Final Office Action dated Oct. 30, 2018 for U.S. Appl. No. 15/186,517.
Bullock, Joshua, Non-Final Office Action dated Jul. 12, 2018 for U.S. Appl. No. 15/186,517.
Bullock, Joshua, Non-Final Office Action dated Jun. 28, 2018 for U.S. Appl. No. 15/439,908.
Bullock, Joshua, Non-Final Office Action dated Jun. 28, 2018 for U.S. Appl. No. 15/439,911.
Clark, K., Feigenbaum, L., Torres, E., "SPARQL Protocol for RDF," W3C Recommendation, Jan. 15, 2008, Retrieved from the Internet [retrieved Mar. 7, 2019].
Copenheaver, Blaine R., Notification of Transmittal of the International Search Report and the Written Opinion of the International Searching Authority, or the Declaration dated Jul. 5, 2017 for International Patent Application No. PCT/US2017/030474.
Czajkowski, K., et al., "Grid Information Services for Distributed Resource Sharing," 10th IEEE International Symposium on High Performance Distributed Computing, pp. 181-184. IEEE Press, New York (2001).
Dean, M., Schreiber, G., "OWL Web Ontology Language Reference," W3C Recommendation, Feb. 10, 2004, Retrieved from the Internet [retrieved Mar. 7, 2019].
Feigenbaum, L., et al., "Semantic Web in Action," Scientific American, pp. 90-97, Dec. 2007.
Fernandez, J., et al., "Lightweighting the Web of Data through Compact RDF/HDT," Lozano J.A., Moreno J.A. (eds) Advances in Artificial Intelligence. CAEPIA 2011. Lecture Notes in Computer Science, vol. 7023. Springer, Berlin, Hidelberg.
Foster, I., Kesselman, C., "The Grid: Blueprint for a New Computing Infrastructure," Morgan Kaufmann, San Francisco (1999).
Foster, I. Kesselman, C., Nick, J., Tuecke, S., "The Physiology of the Grid: An Open Grid Services Architecture for Distributed Systems Integration," Technical Report, Global Grid Forum (2002).
Ganti et al., U.S. Appl. No. 14/058,184, filed Oct. 18, 2013 and entitled, "Assisted Query Formation Validation, and Result Previewing in a Database Having a Complex Schema."
Ganti et al., U.S. Appl. No. 14/058,189, filed Oct. 18, 2013 and entitled, "Assisted Query Formation, Validation, and Result Previewing in a Database Having a Complex Schema."
Ganti et al., U.S. Appl. No. 14/058,206, filed Oct. 18, 2013 and entitled, "Curated Answers Community Automatically Populated Through User Query Monitoring."
Ganti et al., U.S. Appl. No. 14/058,208, filed Oct. 18, 2013 and entitled, "Editable and Searchable Markup Pages Automatically Populated Through User Query Monitoring."
Ganti et al., U.S. Appl. No. 61/802,716, filed Mar. 17, 2013 and entitled, "Data Profile Driven Query Builder."
Ganti et al., U.S. Appl. No. 61/802,742, filed Mar. 18, 2013 and entitled, "Developing a Social Data Catalog by Crowd-Sourcing."
Ganti et al., U.S. Appl. No. 61/802,743, filed Mar. 18, 2013 and entitled, "Creating a Data Catalog by Mining Queries."
Ganti et al., U.S. Appl. No. 61/802,744, filed Mar. 18, 2013 and entitled, "Auto-Completion of Queries With Data Object Names and Data Profiles."
Garcia-Molina, H., Ullman, J., Widom, J., Database Systems: The Complete Book. Editorial Pearson Prentice Hall. Second Edition.
Gawinecki, Maciej, "How schema mapping can help in data integration?—integrating the relational databases with ontologies," ITC School, Computer Science, XXIII Cycle DII, University of Modena and Reggio Emilia, Italy, 2008.
Girma, Anteneh B., Final Office Action for U.S. Appl. No. 13/278,907, dated Apr. 18, 2013.
Girma, Anteneh B., Non-Final Office Action for U.S. Appl. No. 13/278,907, dated Jul. 25, 2012.
Grant, J., Beckett, D., "RDF Test Cases," W3C Recommendation, Feb. 10, 2004, Retrieved from the Internet [retrieved Mar. 7, 2019].
Griffith et al., "Aggregation of Ancillary Data Associated With Source Data in a System of Networked Collaborative Datasets," U.S. Appl. No. 15/927,006, filed Mar. 20, 2018.
Griffith et al., "Data Ingestion to Generate Layered Dataset Interrelations to Form a System of Networked Collaborative Datasets," U.S. Appl. No. 15/926,999, filed Mar. 20, 2018.
Griffith et al., "Extended Computerized Query Language Syntax for Analyzing Multiple Tabular Data Arrangements in Data-Driven Collaborative Projects," U.S. Appl. No. 16/036,834, filed Jul. 16, 2018.
Griffith et al., "Layered Data Generation and Data Remediation to Facilitate Formation of Interrelated Data in a System of Networked Collaborative Datasets," U.S. Appl. No. 15/927,004, filed Mar. 20, 2018.
Griffith et al., "Link-Formative Auxiliary Queries Applied at Data Ingestion to Facilitate Data Operations in a System of Networked Collaborative Datasets," U.S. Appl. No. 15/943,633, filed Apr. 2, 2018.
Griffith et al., "Localized Link Formation to Perform Implicitly Federated Queries Using Extended Computerized Query Language Syntax," U.S. Appl. No. 16/036,836, filed Jul. 16, 2018.
Griffith, David Lee, "Determining a Degree of Similarity of a Subset of Tabular Data Arrangements to Subsets of Graph Data Arrangements at Ingestion Into a Data-Driven Collaborative Dataset Platform," U.S. Appl. No. 16/137,297, filed Sep. 20, 2018.
Griffith, David Lee, "Matching Subsets of Tabular Data Arrangements to Subsets of Graphical Data Arrangements at Ingestion Into Data Driven Collaborative Datasets," U.S. Appl. No. 16/137,292, filed Sep. 20, 2018.
Griffith, David Lee, "Predictive Determination of Constraint Data for Application With Linked Data in Graph-Based Datasets Associated With a Data-Driven Collaborative Dataset Platform," U.S. Appl. No. 16/139,374, filed Sep. 24, 2018.
Haveliwala et al., "Evaluating Strategies for Similarity Search on the Web," Proceedings of the 11th international conference on World Wide Web, May 7-11, 2002, Honolulu, Hawaii, USA (ACM), p. 432-442.
Hayes, Patrick, "RDF Semantics," W3C Recommendation, Feb. 10, 2004, Retrieved from the Internet [retrieved Mar. 7, 2019].
Heflin, J., "OWL Web Ontology Language Use Cases and Requirements," W3C Recommendation, Feb. 10, 2004, Retrieved from the Internet [retrieved Mar. 7, 2019].
Hoang, Hau Hai, Final Office Action dated Jul. 30, 2019 for U.S. Appl. No. 15/186,515.
Hoang, Hau Hai, Final Office Action dated Nov. 26, 2018 for U.S. Appl. No. 15/186,515.
Hoang, Hau Hai, Non-Final Office Action dated Apr. 16, 2019 for U.S. Appl. No. 15/186,515.
Hoang, Hau Hai, Non-Final Office Action dated May 3, 2018 for U.S. Appl. No. 15/186,515.
Htay, Lin Lin M., Non-Final Office Action dated Sep. 14, 2018 for U.S. Appl. No. 15/186,516.
Htay, Lin Lin M., Notice of Allowance and Fee(s) Due and Notice of Allowability for U.S. Appl. No. 15/186,516, dated Jan. 25, 2019.
Hu, Xiaoqin, Final Office Action dated Apr. 5, 2019 for U.S. Appl. No. 15/454,969.
Hu, Xiaoqin, Final Office Action dated Apr. 5, 2019 for U.S. Appl. No. 15/454,981.
Hu, Xiaoqin, Non-Final Office Action for U.S. Appl. No. 15/454,969 dated Dec. 7, 2018.
Hu, Xiaoqin, Non-Final Office Action for U.S. Appl. No. 15/454,981 dated Dec. 12, 2018.

(56) References Cited

OTHER PUBLICATIONS

Hu, Xiaoqin, Non-Final Office Action dated Aug. 1, 2019 for U.S. Appl. No. 15/454,981.
Hu, Xiaoqin, Non-Final Office Action dated Jul. 26, 2019 for U.S. Appl. No. 15/454,969.
J. Perez, M. Arenas, C. Gutierrez, "Semantics and Complexity of SPARQL," ACM Transactions on Database Systems (TODS), Vo. 34, No. 3, Article 16, Publication Date: Aug. 2009.
Jacob et al., "Collaborative Dataset Consolidation Via Distributed Computer Networks," U.S. Appl. No. 16/120,057, filed Aug. 31, 2018.
Jacob et al., "Collaborative Dataset Consolidation Via Distributed Computer Networks," U.S. Appl. No. 16/287,967, filed Feb. 27, 2019.
Jacob et al., "Dataset Analysis and Dataset Attribute Inferencing to Form Collaborative Datasets," U.S. Appl. No. 16/292,120, filed Mar. 4, 2019.
Jacob et al., "Dataset Analysis and Dataset Attribute Inferencing to Form Collaborative Datasets," U.S. Appl. No. 16/271,263, filed Feb. 8, 2019.
Jacob et al., "Management of Collaborative Datasets Via Distributed Computer Networks," U.S. Appl. No. 16/271,687, filed Feb. 8, 2019.
Jacob et al., "Management of Collaborative Datasets Via Distributed Computer Networks," U.S. Appl. No. 16/292,135, filed Mar. 4, 2019.
Jacob et al., "Platform Management of Integrated Access of Public and Privately-Accessible Datasets Utilizing Federated Query Generation and Schema Rewriting Optimization," International Patent Application No. PCT/US2018/018906 filed Feb. 21, 2018.
Jacob et al., "Query Generation for Collaborative Datasets," U.S. Appl. No. 16/395,043, filed Apr. 25, 2019.
Jacob et al., "Query Generation for Collaborative Datasets," U.S. Appl. No. 16/395,049, filed Apr. 25, 2019.
Joshi, Amit Krishna et al., "Alignment-based Querying of Linked Open Data," Lecture Notes in Computer Science, 7566, 807-824, 2012.
Kahn, Yasar et al., "SAFE: Policy Aware SPARQL Query Federation Over RDF Data Cubes," Proceedings of the 7th International Workshop on Semantic Web Applications and Tools for Life Sciences, Berlin, Germany, Dec. 9-11, 2014.
Khong, Alexander, Non-Final Office Action for U.S. Appl. No. 15/165,775, dated Jun. 14, 2018.
Klyne, G., Carroll, J., "Resource Description Framework (RDF): Concepts and Abstract Syntax," W3C Recommendation, Feb. 10, 2004, Retrieved from the Internet [retrieved Mar. 7, 2019].
Krishnan et al., U.S. Appl. No. 15/583,966, filed May 1, 2017 and titled "Automatic Generation of Structured Data from Semi-Structured Data."
Langedgger, Andreas, "XL Wrap—Spreadsheet-to-RDF Wrapper," 2009, Retrieved from the Internet [retrieved Mar. 7, 2019].
Lee, Mark B., Non-Final Office Action for U.S. Appl. No. 13/180,444 dated Jul. 2, 2012.
Lenz, H.J., Shoshani, A., "Summarizability in OLAP and Statistical Data Bases," Proceedings of the Ninth International Conference on Scientific and Statistical Database Management, 1997.
Manola, F., Miller, E., "RDF Primer," W3C Recommendation, Feb. 10, 2004, Retrieved from the Internet [retrieved Mar. 7, 2019].
Martin et al., U.S. Appl. No. 13/457,925, filed Apr. 27, 2012 and titled "Incremental Deployment of Computer Software Program Logic."
Martin et al., U.S. Appl. No. 61/479,621, filed Apr. 27, 2011 and titled "Incremental Deployment of Computer Software Program Logic."
May, P., Ehrlich, H.C., Steinke, T., "ZIB Structure Prediction Pipeline: Composing a Complex Biological Workflow through Web Services," In: Nagel, W.E., Walter, W.V., Lehner, W. (eds.) Euro-Par 2006. LNCS, vol. 4128, pp. 1148-1158. Springer, Heidelberg (2006).
McGuiness, D., Van Harmelen, F., "OWL Web Ontology Language Overview," W3C Recommendation, Feb. 10, 2004, Retrieved from the Internet [retrieved Mar. 7, 2019].
Miranker, Daniel Paul, "Accessing Relational Databases as Resource Description Framework Databases," U.S. Appl. No. 61/406,021, filed Oct. 22, 2010.
Miranker, Daniel Paul, "Automatic Synthesis and Presentation of OLAP Cubes from Semantically Enriched Data Sources," U.S. Appl. No. 61/362,781, filed Jul. 9, 2010.
National Center for Biotechnology Information, Website, Retrieved from the Internet [retrieved Mar. 7, 2019].
Patel-Schneider, P., Hayes, P., Horrocks, I., "OWL Web Ontology Language Semantics and Abstract Syntax," W3C Recommendation, Feb. 10, 2004, Retrieved from the Internet [retrieved Mar. 7, 2019].
Perez, J., Arenas, M., Gutierrez, C., "Semantics and Complexity of SPARQL," In Proceedings of the International Semantic Web Conference (ISWC2006). 2006.
Prud'hommeaux, E., Seaborne, A., "SPARQL Query Language for RDF," W3C Recommendation, Jan. 15, 2008, Retrieved from the Internet [retrieved Mar. 7, 2019].
Raab, Christopher J., Non-Final Office Action dated Jun. 28, 2018 for U.S. Appl. No. 15/186,520.
Raab, Christopher J., Notice of Allowance and Fee(s) Due and Notice of Allowability for U.S. Appl. No. 15/186,520, dated Jan. 2, 2019.
RDB2RDF Working Group Charter, Sep. 2009, Retrieved from the Internet [retrieved Mar. 7, 2019].
Reynolds et al., "Computerized Tool Implementation of Layered Data Files to Discover, Form, or Analyze Dataset Interrelations of Networked Collaborative Datasets," U.S. Appl. No. 15/454,981, filed Mar. 9, 2017.
Reynolds et al., "Computerized Tools to Discover, Form, and Analyze Dataset Interrelations Among a System of Networked Collaborative Datasets," International Patent Application No. PCT/US2018/020812 filed Mar. 3, 2018.
Reynolds et al., "Interactive Interfaces to Present Data Arrangement Overviews and Summarized Dataset Attributes for Collaborative Datasets," U.S. Appl. No. 15/454,969, filed Mar. 9, 2017.
Sahoo, S., et al., "A Survey of Current Approaches for Mapping of Relational Databases to RDF," W3C RDB2RDF XG Report, Incubator Group, Published Jan. 8, 2009.
Sequeda, J., Depena, R., Miranker. D., "Ultrawrap: Using SQL Views for RDB2RDF," Poster in the 8th International Semantic Web Conference (ISWC2009), Washington DC, US, 2009.
Sequeda, J., et al., "Direct Mapping SQL Databases to the Semantic Web," Technical Report Sep. 2004. The University of Texas at Austin, Department of Computer Sciences. 2009.
Sequeda, J., et al., "Ultrawrap: SPARQL Execution on Relational Data," Technical Report. The University of Texas at Austin, Department of Computer Sciences. 2012.
Sequeda, J., Tirmizi, S., Miranker, D., "SQL Databases are a Moving Target," Position Paper for W3C Workshop on RDF Access to Relational Databases, Cambridge, MA, USA, 2007.
Skevakis, Giannis et al., Metadata management, interoperability and Linked Data publishing support for Natural History Museums, Int J Digit Libr (2014), published online: Apr. 11, 2014; Springer-Verlag Berlin Heidelberg.
Smith, M., Welty, C., McGuiness, D., "OWL Web Ontology Language Guide," W3C Recommendation, Feb. 10, 2004, Retrieved from the Internet [retrieved Mar. 7, 2019].
Smith, T.F., Waterman, M.S., "Identification of Common Molecular Subsequences," J. Mol. Biol. 147, 195-197 (1981).
Tirmizi, S., Sequeda, J., Miranker, D., "Translating SQL Applications to the Semantic Web," In Proceedings of the 19th International Databases and Expert Systems Application Conference (DEXA2008). Turin, Italy. 2008.
U.S. Appl. No. 16/251,408, filed Jan. 18, 2019.
Ultrawrap Mapper, U.S. Appl. No. 62/169,268, filed Jun. 1, 2015 (Expired).
Vy, Hung T., Final Office Action for U.S. Appl. No. 13/180,444 dated Dec. 3, 2014.
Vy, Hung T., Final Office Action for U.S. Appl. No. 13/180,444 dated Dec. 9, 2015.

(56) References Cited

OTHER PUBLICATIONS

Vy, Hung T., Final Office Action for U.S. Appl. No. 13/180,444 dated Feb. 22, 2013.
Vy, Hung T., Non-Final Office Action for U.S. Appl. No. 13/180,444 dated Jun. 18, 2015.
Vy, Hung T., Non-Final Office Action for U.S. Appl. No. 13/180,444 dated Mar. 26, 2014.
Vy, Hung T., Non-Final Office Action for U.S. Appl. No. 15/273,930 dated Dec. 20, 2017.
Yen, Syling, Final Office Action dated Apr. 10, 2019 for U.S. Appl. No. 15/186,519.
Yen, Syling, Non-Final Office Action dated Feb. 8, 2019 for U.S. Appl. No. 15/186,519.
Yen, Syling, Non-Final Office Action dated Sep. 12, 2019 for U.S. Appl. No. 15/186,519.
Young, Lee W., International Searching Authority, Notification of Transmittal of the International Search Report and the Written Opinion of the International Searching Authority, or the Declaration for International Patent Application No. PCT/US2017/037846, dated Nov. 9, 2017.
Young, Lee W., International Searching Authority, Notification of Transmittal of the International Search Report and the Written Opinion of the International Searching Authority, or the Declaration for International Patent Application No. PCT/US2018/020812, dated Aug. 8, 2018.
Young, Lee W., Invitation to Pay Additional Fees and, Where Applicable, Protest Fee, dated Jun. 14, 2018 for International Application No. PCT/US2018/020812.
Young, Lee W., Notification of Transmittal of the International Search Report and the Written Opinion of the International Searching Authority, or the Declaration dated May 29, 2018 for International Patent Application No. PCT/US2018/018906.
Young, Lee W., Notification of Transmittal of the International Search Report and the Written Opinion of the International Searching Authority, or the Declaration for International Application No. PCT/US2011/057334, dated Mar. 22, 2012.
Nguyen, Kim T., Non-Final Office Action dated Jun. 14, 2018 for U.S. Appl. No. 15/186,514.
Nguyen, Kim T., Non-Final Office Action dated Mar. 20, 2019 for U.S. Appl. No. 15/454,923.
Nguyen, Kim T., Notice of Allowance and Fee(s) Due, dated May 15, 2019 for U.S. Appl. No. 15/454,923.
Niinimaki et al., "An ETL Process for OLAP Using RDF/OWL Ontologies," Journal on Data Semantics XIII, LNCS 5530, Springer, pp. 97-119, Aug. 12, 2009.
Pandit et al., "Using Ontology Design Patterns to Define SHACL Shapes," CEUR Workshop Proceedings, Proceedings of the 9th Workshop on Ontology Design and Patterns (WOP 2018), Monterey, USA, Oct. 9, 2018.
Parashar et al., U.S. Appl. No. 62/329,982, filed Apr. 29, 2016 and titled "Automatic Parsing of Semi-Structured Data and Identification of Missing Delimiters."
Griffith et al., "Transmuting Data Associations Among Data Arrangements to Facilitate Data Operations in a System of Networked Collaborative Datasets," U.S. Appl. No. 15/943,629, filed Apr. 2, 2018.

* cited by examiner

Input: S: SQL-DDL of the relational schema
Ouput: TripleView: a SQL CREATE VIEW that generates the TripleView (1) Transform SQL-DDL to Putative Ontology PO ← SQL-DDL
(2) Initialize list of all select statements S ← 0
(3) for each ontological object o of PO
(4) if(o is a Class)
(5)     S ← SELECT 'o.name+o.pk' as s, o.pk as spk, 'rdf:type' as p, o.name as o, null as opk FROM o.name
(6) else if(o is a Datatype Property)
(7)     S ← SELECT 'o.domain+o.pk' as s, o.pk as spk, 'x.name' as p, x.name as o, null as opk FROM x.domain
(8) else if(o is a Object Property)
(9)     if(o is a Binary Relation)
(10)        S ← SELECT 'x.domain+x.domain.pk' as s, x.domain.pk as spk, 'x.name' as p, 'x.range+x.range.pk' as o, x.range.pk as opk FROM x.name
(11)    else if(o is a foreign key)
(12)        S ← SELECT 'x.domain+x.domain.pk' as s, x.domain.pk as spk, 'x.name' as p, 'x.range+x.range.pk' as o, x.range.pk as opk FROM x.domain
(13)    end if
(14) end if
(15) end for each
(16) TripleView ← 'CREATE VIEW TripleView(s, spk, p, o, opk) AS'
(17) for each select statement s of S
(18)    TripleView ← s + 'UNION ALL'
(19) end for each

Figure 6

RDF Triples

| S | SPK | P | O | OPK |
|---|---|---|---|---|
| Course3 | 3 | rdf:type | Course | null |
| Course3 | 3 | course_title | CS101 | null |
| Course3 | 3 | course_dept | Dept5 | 5 |
| Dept5 | 5 | rdf:type | Dept | null |
| Dept5 | 5 | dept_name | CS | null |
| Course4 | 4 | rdf:type | Course | null |
| Course4 | 4 | course_title | EE101 | null |
| Course4 | 4 | course_dept | Dept6 | 6 |
| Dept6 | 4 | rdf:type | Dept | null |
| Dept6 | 4 | dept_name | EE | null |

SQL Schema

```
SELECT ?title ?name
WHERE {
    ?x course_title ?title .
    ?x course_dept ?y.
    ?y dept_name ?name
}
```

```
SELECT
    t0.o as title, t2.o as name
FROM TripleView t0, TripleView t1,
     TripleView t2
WHERE
    t0.p = 'course_title' AND
    t1.p = 'course_dept' AND
    t2.p = 'dept_name' AND
    t0.sk = t1.sk AND
    t1.ok = t2.sk
```

CREATE VIEW tripleView
...
UNION
SELECT "Course"+courseID as s, "Course#title" as p, title as o
FROM Course
WHERE title is not null
UNION
...

Figure 10a tripleView Without Implelmenting the Creation of URIs (b)

CREATE VIEW tripleView
...
UNION
SELECT "Course"+courseID as s, "http://example.com/university/course" as p, title as o
FROM Course
WHERE title is not null
UNION
...

Figure 10b tripleView With Implelmenting the Creation of URIs

Fig 14

$$\Pi_{a_i, a_j} \leftarrow \sigma_{a_j \text{ is not null and } a_j \text{ is not null}} \leftarrow R$$

SYSTEM FOR ACCESSING A RELATIONAL DATABASE USING SEMANTIC QUERIES

This application claims priority as a continuation of U.S. patent application Ser. No. 15/165,775, filed on May 26, 2016, which is a continuation of U.S. patent application Ser. No. 14/220,526 filed on Mar. 20, 2014, now issued as U.S. Pat. No. 9,396,283, issued on Jul. 19, 2016, which is a continuation of U.S. patent application Ser. No. 13/278,907 filed on Oct. 21, 2011, now issued as U.S. Pat. No. 8,719,252 issued on May 6, 2014 which is a nonprovisional application that claims the benefit of U.S. Provisional Patent Application No. 61/406,021, filed on Oct. 22, 2010, all of which are hereby incorporated by reference for all that they teach.

This invention was supported in part by a grant from the National Science Foundation, Grant No. 1018554 and portions of this invention may be subject to a paid-up license to the U.S. Government.

BACKGROUND

The goals of Semantic Web technology include creating a structurally uniform representation of heterogeneous data, data models, and application domain models in a stack of computer languages, RDF (Resource Description Framework), RDFS (RDF Schema), OWL (Web Ontology Language) and SPARQL (SPARQL Protocol and RDF Query Language), also known as the Semantic Web stack. The Semantic Web as a computing process, architecture and form of organizing data has been described and implemented in various ways by the W3C (World Wide Web Consortium), which is the industry group that maintains Internet protocol and data formatting standards. For more information on the semantic web, see "Semantic Web in Action", Scientific American, December 2007, Feigenbaum et. al., incorporated herein by reference. RDF is a graph representation of data. SPARQL is an SQL-like language for querying RDF data sources. RDFS and OWL provide richer means to encode structure and domain models and logic. The entire system is object-oriented where RDFS and OWL inherit from RDF. The entire stack is well grounded to integrate knowledge-based, and logic-based solutions to data integration, mining and analysis problems.

Relational database management systems support a wide range of applications. Relational databases comprise data stored as records in tables, (synonymously rows in relations). Each table defines a record structure comprising a set of named columns. SQL is a standardized language used to define and query relational databases.

This invention is a system and method for integrating relational databases into a semantic web framework utilizing a simple mapping process and the SQL query optimizer present in the SQL database engine. Functionally this means, a domain model for the relational database is made available in a Semantic Web language and the database contents is made available for retrieval through standard SPARQL query and linked-data end-points.

SUMMARY OF THE INVENTION

The invention is comprised of four primary components. Two components comprise a compile time aspect. These compile time components may be integrated 103 or accomplished separately.

A first component 103 algorithmically transforms the relational databases SQL schema, to an equivalent representation in one or more Semantic Web languages, including, but not limited to RDF (Resource Description Framework), RDFS, OWL or RIF. The transformation is made consistent with the semantic web schema. The result is called the synthesized domain model. In one embodiment, the transformation includes the relational constraints. The synthesized domain model acts as a mapping of the relational schema to the semantic web schema. The mapping can be used to map the semantic web schema back to the relational schema.

In one embodiment the URIs (Uniform Resource Identifier) that identify the elements in the synthesized domain model may be replaced with different URIs. The replacement URIs may come from an existing domain model. The replacement URIs may also be defined so the results are more fitting for the consumption of the output of the system. In one embodiment, URIs are the standard RDF method for representing labels in an ontology. In other embodiments the label representation of any formalized ontology system may be used.

For example, the RDF of the relation data can be represented as a relation with three columns: subject, predicate and object. The SQL schema may identify tables, for example, if the database is storing employee information, a table for "EMPLOYEES", where there is a column denoting "NAME". The RDF representation of the relational data stored in this SQL schema consists of a triple where the subject is the URI that identifies a row of the "EMPLOYEE" table, the predicate is the URI that identifies the "NAME" attribute and the object is the value of "NAME" for the row.

A second component 103 that creates a relational database representation of the relational data as RDF triples that can respond to SQL queries. The precise content of the RDF triples is determined by and is consistent with the synthesized domain model. The content and structure of the RDF triples is determined by one or more queries. The queries may be embedded in a SQL CREATE VIEW command or may be used directly to materialize the RDF triples. Materialize means that the resulting data is produced, rather than relying on a logical rule that has to be executed. It is common for relational database systems to offer configuration options such that a VIEW command is implemented as a logical construct or by materializing and storing the results of the embedded SQL query.

Two additional components comprise a runtime aspect that executes SPARQL queries.

A third component 105 that translates a SPARQL query to an equivalent SQL query that operates on the relational representation of its contents as triples. The arguments of the SQL query include the RDF representations of the relational database data contents. Those values are derived from the mapping from the relational database to the RDF, that is, the synthesized domain model. The system and method does not require materializing the RDF triples. Instead, a logical definition using the CREATE VIEW command can be used to either logically create a triple table or to materialize one. In one embodiment, an incoming SPARQL query is translated into a syntactically equivalent SQL query that can operate on the relational database engine by using the VIEW logically, or can act on the triples materialized from the relational database using the VIEW or replace the VIEW in the FROM clause with the results of the VIEW command in SQL. The VIEW logically defines a three column view (subject, property and object), containing one data value per triple. It is common that the column names of the relational database become property IRI (Internationalized Resource Identifiers) in the synthesized domain model. The translation module will parse the SPARQL query using typical computer cross compiling processing and computer language grammar. Property IRIs in the SPARQL query are translated into SQL as equality tests on the property column of the view. In one embodiment, the primary keys are used explicitly in the synthesized domain model. In another embodiment an unlabeled RDF node, a blank node, is used to represent the association of data, values. The SPARQL query translation to SQL includes database JOINs and OUTERJOINs on the three column view such that the resulting SQL query can represents the assembly of separate RDF data nodes into values in the same relational database record. The SQL query may include formatting commands such that the final output is a structured SQL representation or any accepted serialized format for SPARQL queries, including XML. In another embodiment, the SQL output is sent to a separate module that re-formats the data to conform with the requirements of the SPARQL query.

A fourth component is the relational database engine itself. The relational database engine contains a SQL query optimizer 111. Typical relational databases contain a SQL query optimizer that will re-organize a SQL query into one or more steps in order to run the actual database table and record searches more quickly. These steps may be re-ordered or manipulated to make the data access process more efficient. For example, a selection condition that is in the query can be broken up into a combination of simpler conditions. Other manipulations using relational algebra may be used to optimize the SQL query. The optimizer is used for rewriting triple based queries and effecting execution of a SQL on the relational representation. As a result of the SQL query, the output of the data is equivalent to the execution of the SPARQL query directly on the RDF representation of the data. The SQL optimizer does all of the rewrites to fetch the data automatically. Therefore, no specialized software is required to perform the translation.

In another embodiment, the runtime aspect may be organized such that the SPARQL to SQL translator 105 does not organize the final output, but rather derives only a SQL query that produces results in a representation common to relational databases 205 and the final formatting is accomplished by another software component 206.

It is understood that what is referred to as "triple" may in other embodiments also be a table, a logical view definition or a materialized view. It is understood what is referred to as a "triple" may be represented with more than 3 columns where in addition to the subject, property and relation columns, index columns or other ancillary information may be included. There may be more than one triple table where a given table would be for a particular datatype. Therefore a "triple" table may refer to a table with more than three columns and there may be more than one triple table used to process a query, so that the query can be applied to more than one datatype.

There are a number of acceptable printable formats for the results of SPARQL queries, including RDF. See "SPARQL Query Language for RDF", W3C Recommendation, January 2008, by Eric Prud'hommeaux and Andy Seaborne which is incorporated herein by reference. RDF itself has a number of acceptable printable formats including RDF/XML see "RDF/XML Syntax Specification (Revised)" by Dave Beckett, "Turtle—Terse RDF Triple Language" by Dave Beckett and Tim Berners-Lee and "Notation 3" by Tim Berners-Lee.

Alternately the runtime aspect may provide data according to Linked Data protocols. Given a URI, it executes a SPARQL query and the RDF result is returned over HTTP. For more information on Linked Data see "Linked Data" by Tim Berners-Lee, incorporated herein by reference

BRIEF DESCRIPTION OF THE DRAWINGS

FIG. 6: Algorithm to create a relational triple representation given the SQL-DDL of the relational schema FIG. 8: Example SPARQL query and a semantically equivalent SQL query on the relational triple representation

FIG. 10: Example of Tripleview before and after the label substitution

FIG. 14. Logical query plan for BSBM6 after Self-join Elimination optimization.

DETAILED DESCRIPTION OF THE PREFERRED EMBODIMENTS

Figure 1:
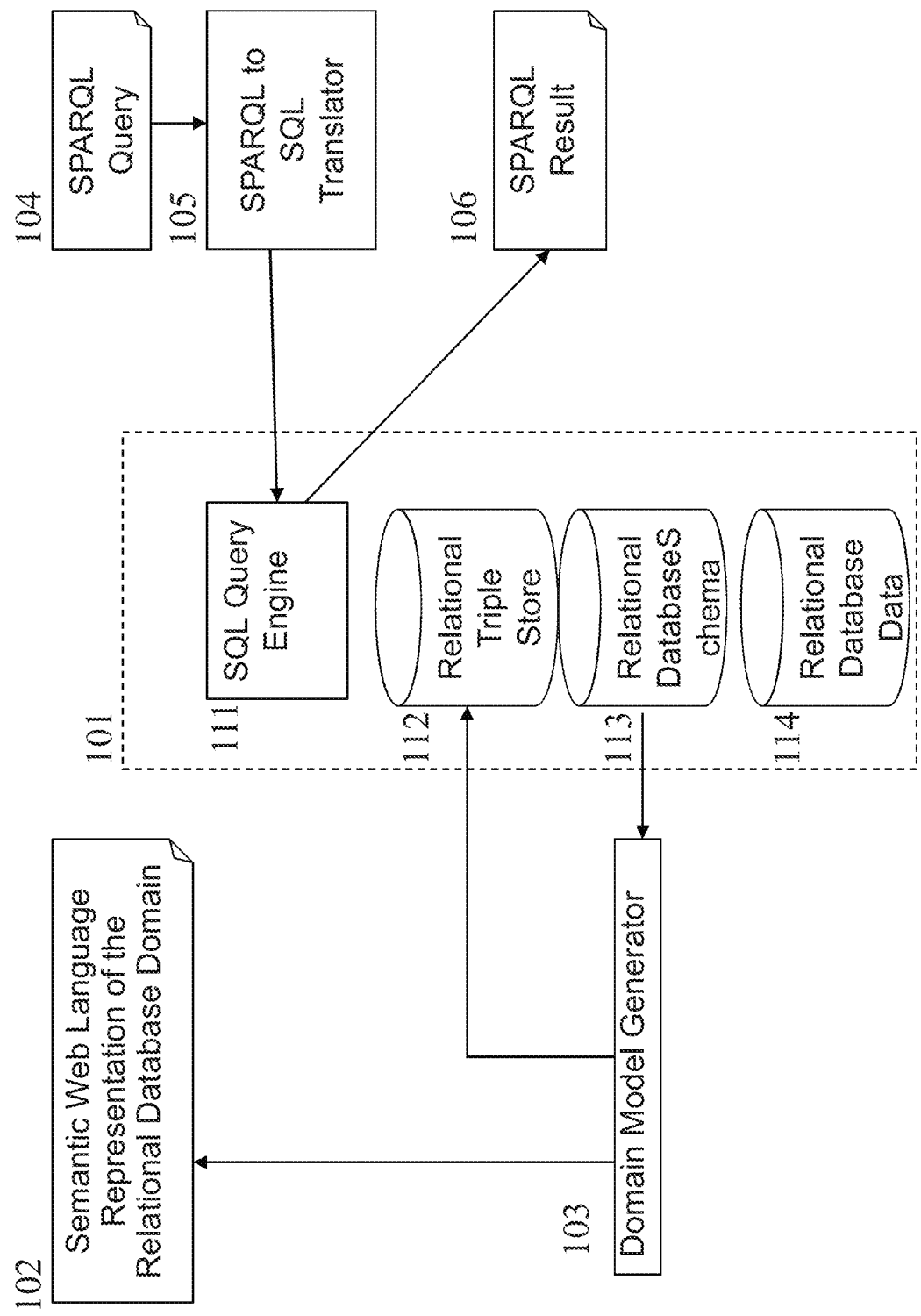
FIG. 1: Diagram of the relation between components of the invention
Figure 2:
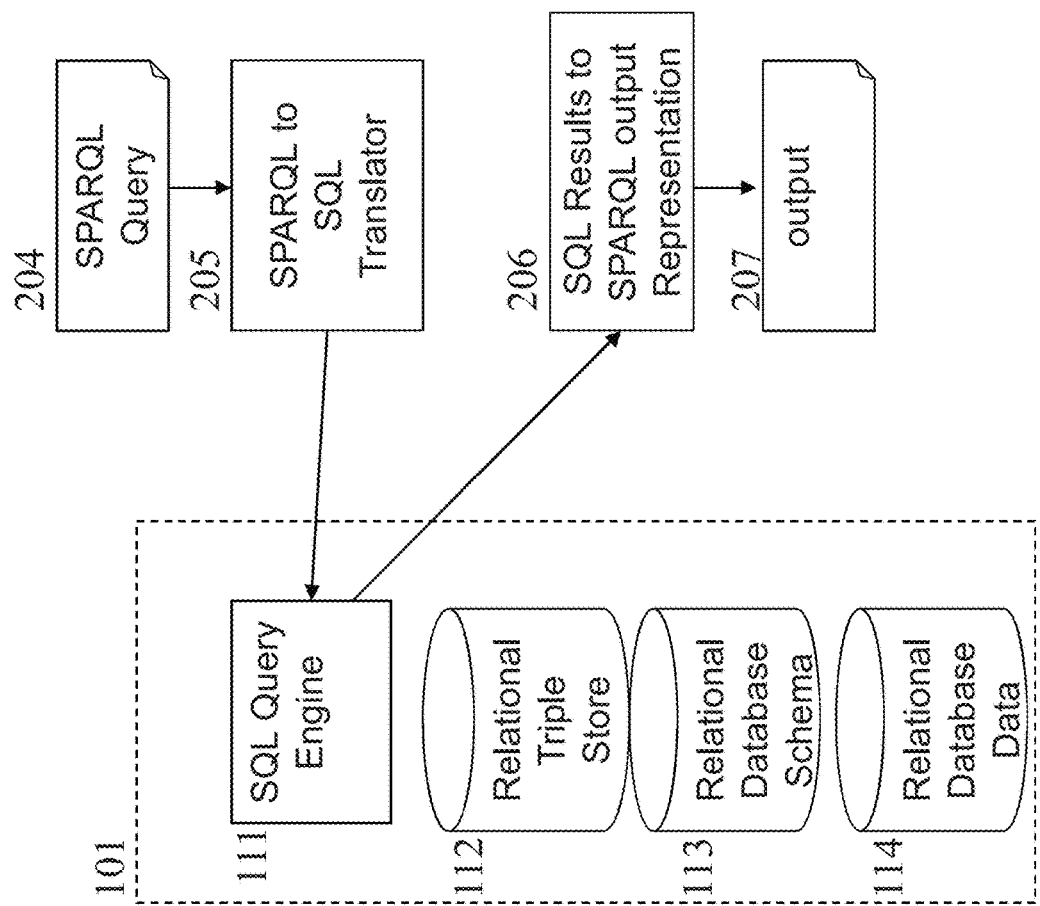
FIG. 2: Diagram of alternate organization for more general output formatting
Figure 3:
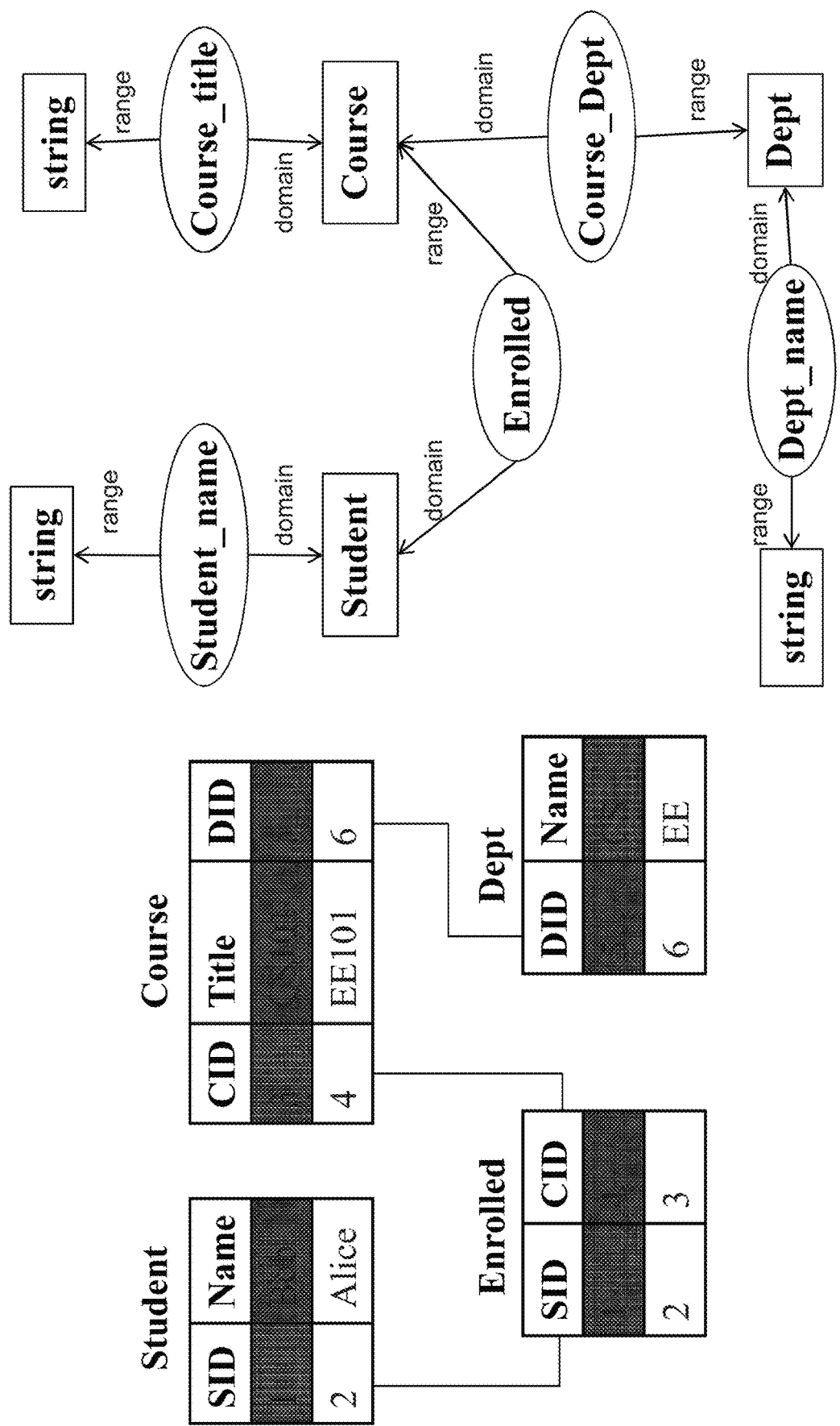
FIG. 3: An example relational schema and its synthesized domain model
Figure 4:
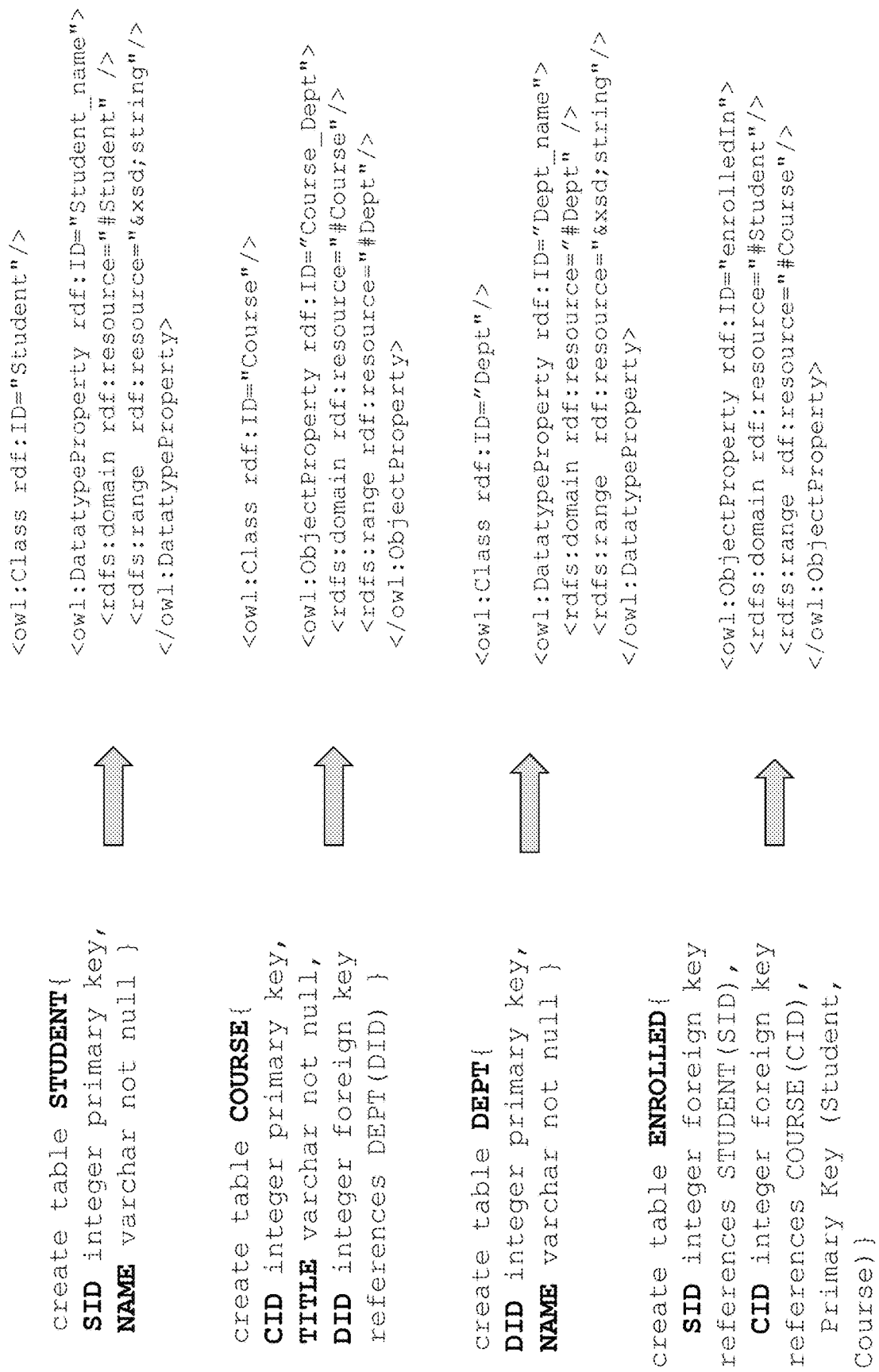
FIG. 4: An example relational schema in SQL-DDL and its synthesized domain model in OWL using RDF/XML syntax
Figure 5:
FIG. 5: An example relational schema in SQL-DDL and its synthesized domain model in RDFS using RDF/XML syntax

The component 103 algorithmically transforms the relational databases SQL schema, possibly including constraints, to an equivalent representation in one or more Semantic Web languages, including, but not limited to RDF, RDFS, OWL or RIF. The result is called the synthesized domain model. FIG. 3 contains a figurative example of such a translation. FIGS. 4 and 5 show examples of SQL schema definition statements and corresponding representation as OWL and RDFS, respectively. For detailed translation rules see "Translating SQL Applications to the Semantic Web", by Syed H. Tirmizi, Juan F. Sequeda, and Daniel P. Miranker, Proceedings of the 19th International Databases and Expert Systems Application Conference (DEXA2008), Turin, Italy. 2008, incorporated herein by reference.

Figure 7:
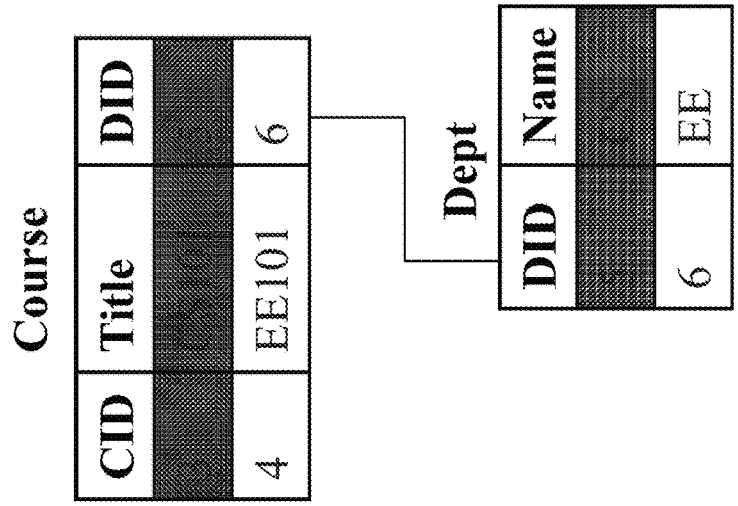
FIG. 7: Example relational schema with instances and the relational triple representation with the same instances

FIG. 6 details a process to create a relational representation of the relational database as RDF triples in a single relation. FIG. 7 illustrates an example relational database and the RDF triples resulting from the process. The query may be embedded in a SQL CREATE VIEW statement, thus creating a logical definition of the relational database as RDF.

In particular, the create view can be materialized instead of being maintained as a run-time rule. Alternatively, the query generated by the algorithm in FIG. 6 may be used to query the database. The results may be stored in the local database, in another relational database or in a conventional triple-store such as Virtuoso or Jena, or some other RDF database management system. The embodiment detailed in FIG. 6 casts all data into a string data type. In another embodiment, the process may produce a number of tables, one for each SQL data type.

Figure 9:
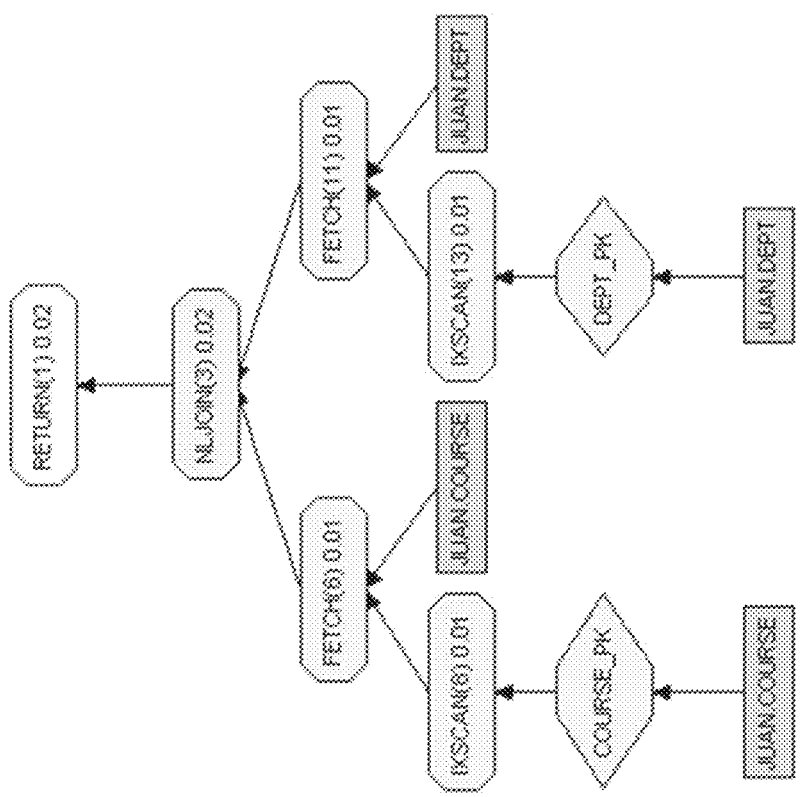
FIG. 9: Example DB2 query plan for query in FIG. 8
Figure 11:
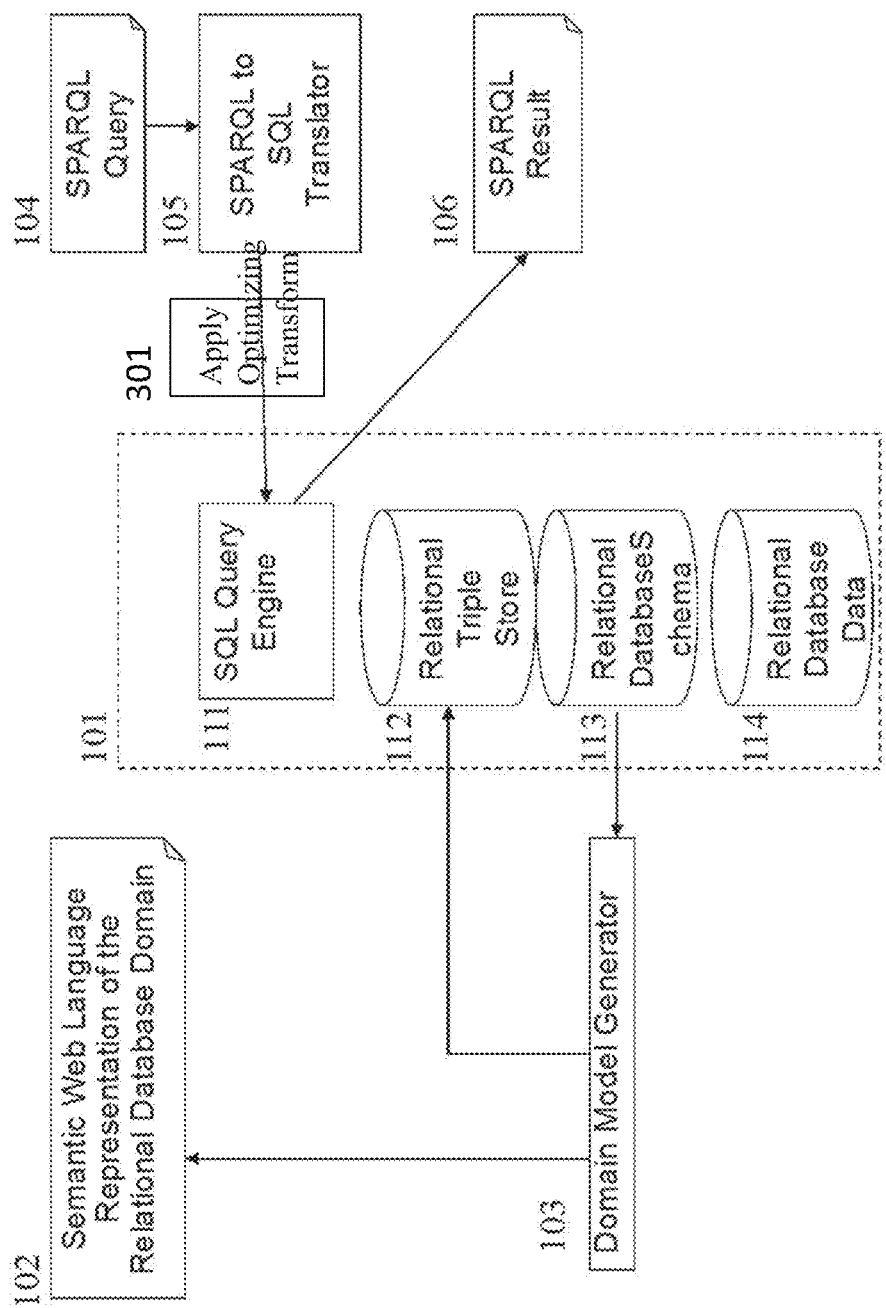
FIG. 11: Components of the Invention including optimization transform.

The SPARQL to SQL translator, 105 205, substitutes SPARQL strings for SQL strings. For substitutions see, "The Expressive Power of SPARQL." Proceedings of the 7th International Semantic Web Conference (2008) R. Angles, C. Guituerrez and See "SPARQL Query Language for RDF". W3C Recommendation. January 2008, by Eric Prud-'hommeaux and Andy Seaborne both of which are incorporated herein by reference. An example of the substitution is illustrated in FIG. 8. The resulting SQL query is executed by the SQL engine. FIG. 9 shows the query plan produced by IBM's DB2 relational database system for the query in FIG. 8.

Prior art approaches for management of the semantic web are either based on RDBMS or are native database management systems for triples. Jena, Oracle, Sesame and 3 store are some examples of triple stores that use RDBMS. These approaches center on a single triple table and a look up table. Others consider a property table approach. The previous approaches mentioned are focused on storing Semantic Web data. The prior art does not address what happens in the frequent situation where legacy relational database data needs to be exposed in the Semantic Web. The problem can be recast as: how can RDF and Linked Data be created from legacy relational data. There are two options: have a static dump of the data in RDF or dynamically generate RDF and being able to query a relational database with SPARQL. Relational data can be transformed into RDF through existing ETL methods. However these static approaches have a drawback when it comes to consistency with the relational data. Furthermore, it is not possible to query the relational data with SPARQL through these methods.

Dynamic approaches map the relational database schema with existing ontologies and vocabularies used on the Semantic Web. When a SPARQL query is issued, the mapping between the relational schema and ontology allows the query to be translated into a SQL query that is executed over the relational database. The prior art include manually creating mappings between the two regimes. A manually created mapping between the ontology and the relational schema with the SQL language and not a view of triples is difficult and not efficient and automatic.

In the preferred embodiment, the invention is a compiled system. During initialization the database is examined by querying the data catalog. Relational representations are compiled to Semantic Web representations. Reading the catalog and creating views commonly requires administrative permissions, which must be enabled. At runtime, SPARQL queries are naively translated to SQL.

These four components are divided into an initialization and query evaluation phase. The initialization phase is composed of the first two components. By deriving automatically the ontology, the relational data can be represented in triples. The creation of the intentional triples eliminates the problem of consistency between a triple store and the relational database by never creating a physical copy of the triples. The last two components are part of the query evaluation phase. SPARQL queries are naively translated to SQL queries that operate on the triples. The query engine automatically performs to implement the intricate rewrites from a triple-based evaluation to a relational evaluation.

To create the OWL description of the legacy database the invention maps one schema to the other. In one embodiment, the mapping of Tirmizi et. al. is used. Whether the results of a purely syntax driven translation of a SQL schema to OWL will result in an OWL file with all the properties necessary for an axiom system to be an ontology is controversial. Thus, we call the resulting OWL an example of a putative ontology (PO). A putative ontology would be any syntactic transformation of a data source schema to an ontology. Tirmizi et al's mapping includes translations for all SQL table and constraints, including enumerations. Further the system includes mappings for each association created by every possible combination of primary and foreign keys.

The first data description language (DDL) specified in the first SQL standard offered little more expressive power beyond that of relational algebra. Clearly legacy databases dating back to that first SQL standard will have few, if any, explicit, application domain detail. The OWL ontology generated from that representation will have dubious value as an ontology. However the current SQL standard includes a rich constraint system. Modern data modeling efforts provide for the inclusion of application-based constraints.

Figure 17:
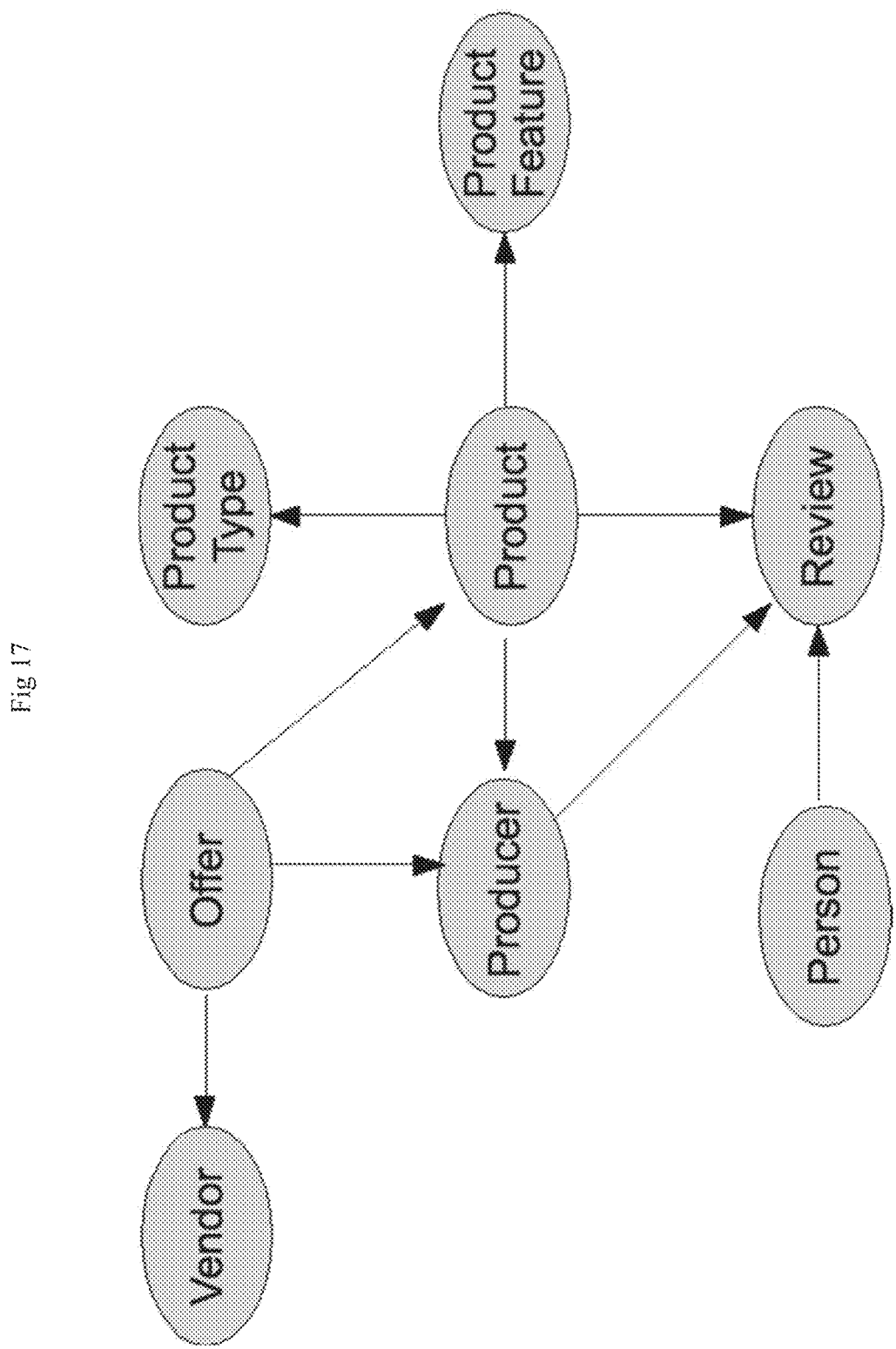
FIG. 17. Resulting transform to an OWL Putautive Ontology.
Figure 18:
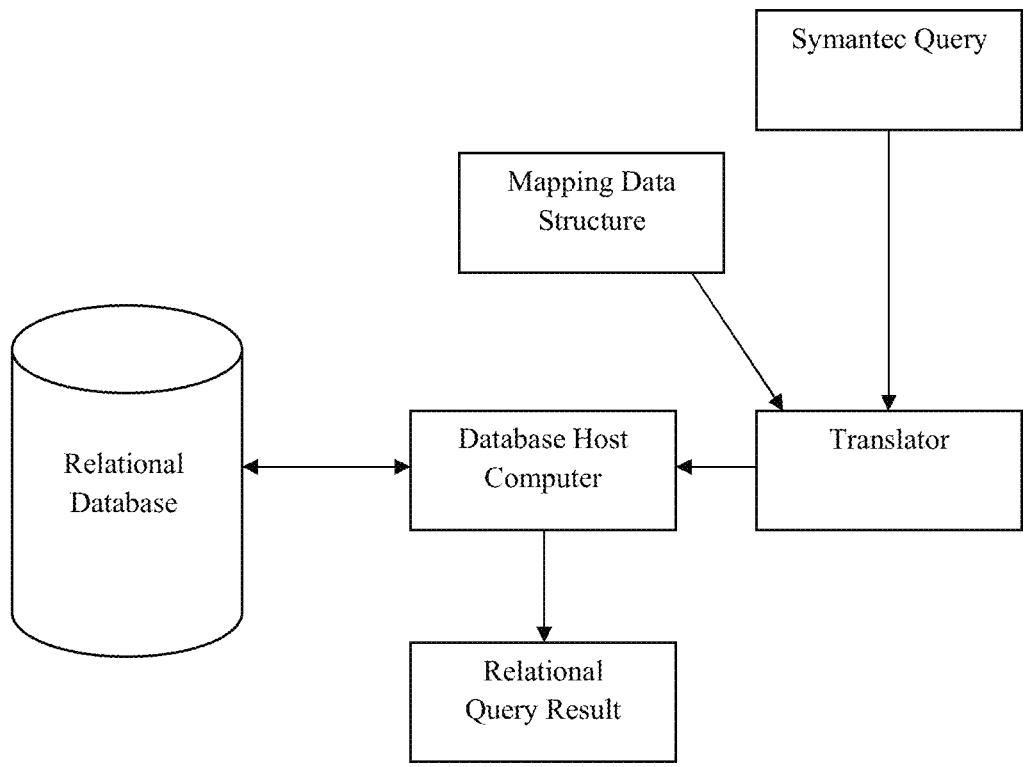
FIG. 18. Example system embodiment.

In another embodiment, the first step is to generate a putative ontology based on the SQL-DDL of the input schema. In one embodiment, the BSBM schema (FIG. 15) is used as the input. The result of transforming the relational schema to an OWL PO following the rules of Tirmizi et al. is shown in FIG. 17.

Relational Database as RDF Triples

The invention utilizes a synthetic domain model, (also referred to as putative ontology or "PO"), as the basis for a user to develop SPARQL queries. As ontology matching systems are integrated into the Semantic Web to provide seamless webs of linked data, we anticipate that for many systems synthetic domain models, or putative ontologies will be sufficient for the purpose. Consequently, the details of the triple or RDF representation of the database contents must be consistent with the synthetic domain model.

In one embodiment, the definition of the triple representation is intentionally presented as a SQL view. This view consists of the union of all the queries that define all the triples based on the PO. In other words, the view logically defines a three column view (subject, predicate and object), containing one row per triple.

Figure 15:
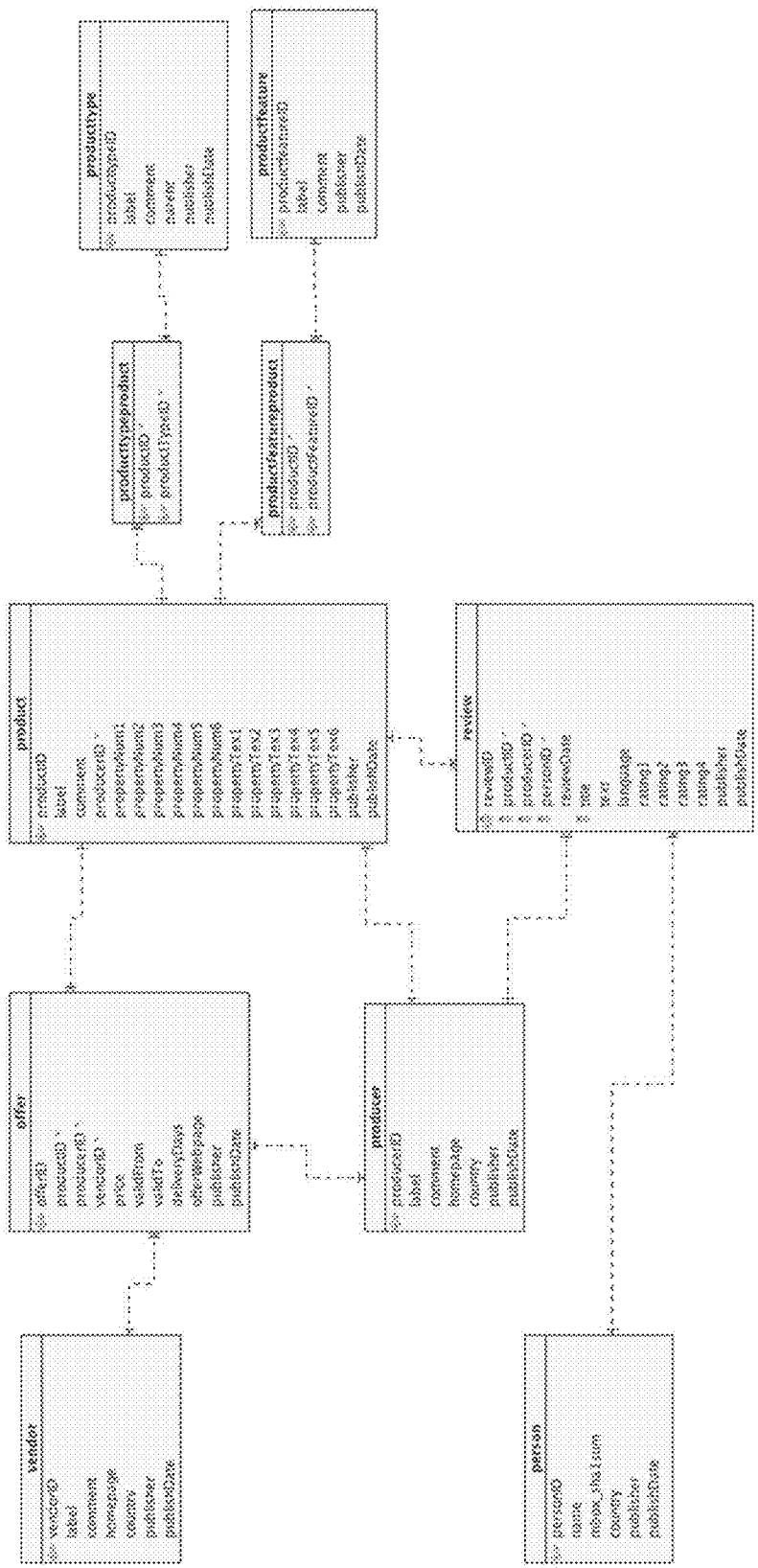
FIG. 15. Example BSBM relational schema.
Figure 16:
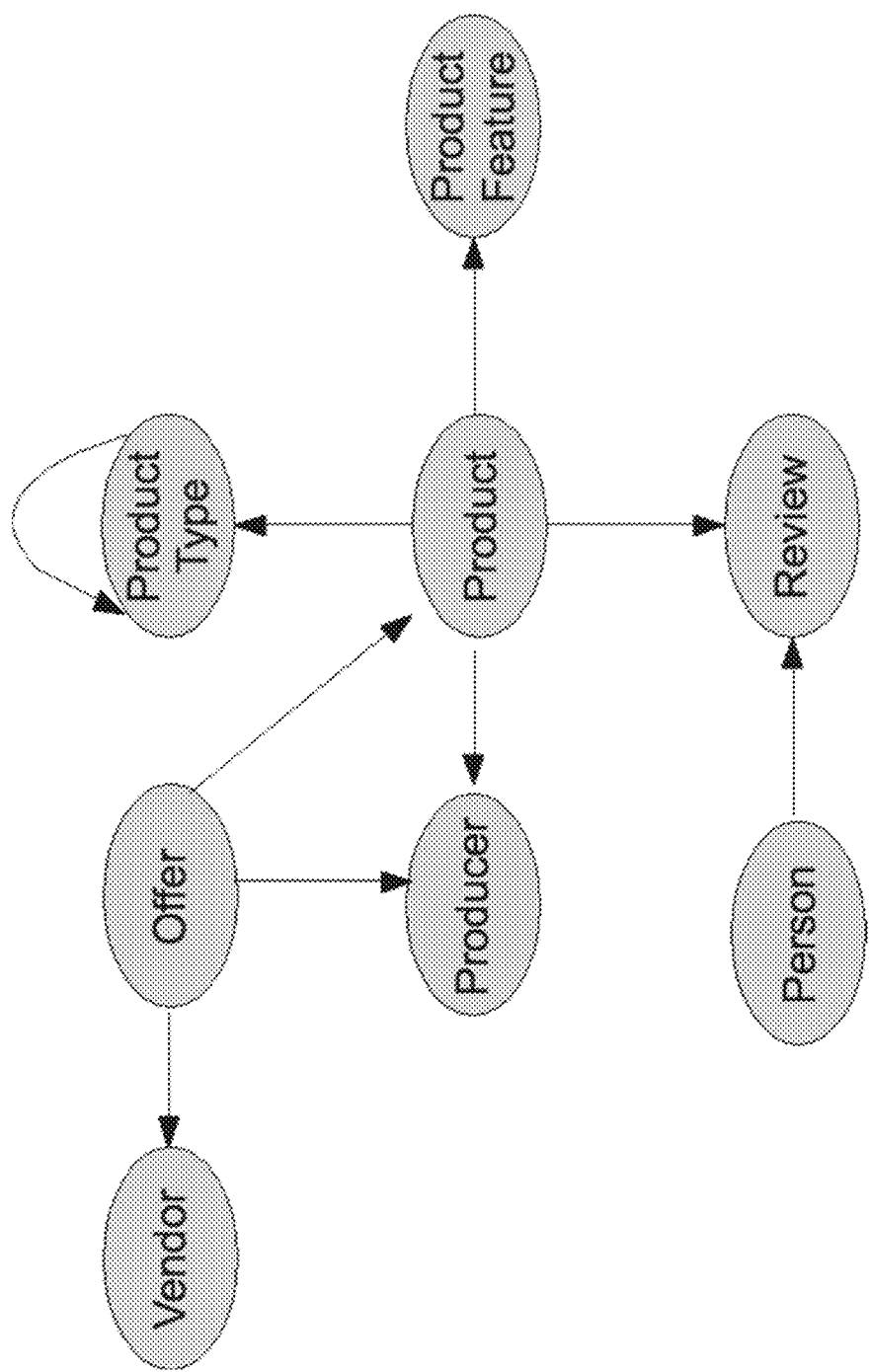
FIG. 16. Resulting transform to an OWL Putautive Ontology.

For example, consider the table Product from the relational schema (See FIG. 15). The invention translates the table Product into the ontological concept Product. Afterwards, SQL queries need to be generated that defines the triple statements for each translation. For example, it is necessary to define in triple statements that there is a Product that has a label "ABC", a numerical property of 1 and 2. An example of this query is shown in Table 1. Finally, the union of all these queries defines the final triple view, as shown in Table 2.

TABLE 1

Example of Product relation from the relational schema.

| Id | Label | propNum1 | propNum1 |
|----|-------|----------|----------|
| 1  | ABC   | 1        | 2        |
| 2  | XYZ   | 3        | 3        |

SELECT "Product"+Product.id as s, "rdf:type" as p
  "Product" as o FROM Product

SELECT "Product"+Product.id as s, "product#label"
  as p "ABC" as o FROM Product.                (1)

TABLE 2

SQL Triple View of the Product relation from BSBM schema.

| S | P | O |
|---|---|---|
| Product1 | rdf:type | Product |
| Product1 | label | ABC |
| Product1 | propNum1 | 1 |
| Product1 | propNum2 | 2 |

In this example, we only take in account the generation of owl:Class, owl:ObjectProperty and owl:DatatypeProperty. Therefore given the PO, the relational data can be mapped to a SQL view with the following process:
For a Database D
   CREATE VIEW TripleView(s,p,o) AS UNION [U]
for each x
   if(x instanceOf Class)
     insert 'SELECT x.name+x.primarykey, 'rdf:type', x.name FROM x.name' into U
   if(x instanceOf Datatype Property)
     insert 'SELECT x.domain+x.primaryKey, 'ns:x.name', x.name FROM x. domain'
into U
   if(x instanceOF Object Property)
     insert 'SELECT x.domain+x.primaryKey, 'x. name', x.range+x.primaryKey FROM x.name' into U Most triple stores implemented as triple tables do not store strings in the triple table. Instead, they store keys or hash values in the triple. These keys are then mapped to a look up table, like a dictionary. However, this invention creates a view over the strings. The objective is to assure real-time consistency between the relational and RDF presentation of the data. Therefore, if the relational data is updated, the RDF should be consistent in real-time. Another embodiment is to implement the triple and dictionary table like other approaches. This may be costly to maintain the dictionary table consistent in real-time with the relation data. Furthermore, current triple stores in the art typically hash values because they are storing URIs. In another embodiment of the invention, URI's are not stored, therefore the size of the strings are much smaller. For that reason, it is valuable to create a view over the strings.

The query evaluation phase is the second stage of the invention's methods. This phase gets executed when a SPARQL query is issued. The first part is to translate the SPARQL query to an equivalent SQL query that gets executed over the SQL view. The final step is in which the SQL query optimizer, rewrites the triple based SQL query to a SQL query that executes on the extensional relational data.
SPARQL to SQL The SPARQL to SQL component of the invention naively translates a SPARQL query to a SQL query that is issued to operate on TripleView as the FROM. For example, the SPARQL query in (2) is translated to the SQL query in (3).

SELECT ?product ?label

WHERE {

?product label ?label.

?product propNum1 1.

?product propNum2 2.}. (2)

SELECT t1.s as product, t1.o as label FROM tripleview t1, t2, t3

WHERE and t1.p='label' and t2.s=t1.s and t2.p='propNum1' and t3.s=t1.s and t3.p='propNum2'. (3)

In another embodiment, the query optimizer of the database engine is used to rewrite the query to the native SQL query on the relational schema. Consider a datalog syntax to represent the TripleView in Table 2 from the relation table in Table 1.

Triple(1, label, ABC):—Product(1,ABC,_, _)

Triple(1, propNum1, 1):—Product(1,_, 1,_)

Triple(1, propNum1, 2):—Product(1,_,_, 2). (4)

Now consider the query in (2). In a datalog syntax, this would be represented:

Answer(X, Y): —Triple(X, label, Y),

Triple(X, propNum1, 1),

Triple(X, propNum2, 2) (5)

The native SQL query on the relational table would be:

SELECT id, label FROM product WHERE propNum1=1 and propNum2=2 (6)

In datalog syntax, this query would be represented:

Answer(X, Y):—Product(X, Y, 1, 2) (7)

Now if the SPARQL query (2) is substitute with the definition of the view (4), we have the following:

Answer(X, Y):—Product(X,Y, 1, _), Product(X,Y, _, 2) (8)

Finally, by unifying both predicates, we get the same result as (7), which is the same native SQL query on the relation schema.

The SQL schema of a relational database can be automatically translated into an OWL putative ontology or synthetic domain model, by applying transformation rules.

Finally, due to its syntactic transformation, the putative ontology takes the terminology derived from the SQL DDL.

Given the SQL query to operate over the tripleView, the SQL optimizer is able to generate a query plan that will rewrite the query that is to be executed on the relational data. Consider the relational table shown in Table 1. Generating the triples from this relational table would yield the triple table shown in Table 2. Now consider the SPARQL query shown above at (2). The SQL query on the relational table would be:

SELECT label FROM product WHERE propNum1=1 and propNum2=2 (9)

Without any index support, the SQL query on the relational table would execute in $O(n)$, where n is the number of rows. However, in the case of a triple table, for each triple pattern in the SPARQL query, there needs to be a self-join. For native triple stores that are represented in triple tables, there is not a way to avoid the self-join, because the query optimizer is only aware of one table: the triple table. Hence, in triple-tables, the self-joins are not compiled out. The triple version of a relational table will contain c*n rows where c is the number of columns and n is the number of rows. Therefore, the worst case complexity when executing a SPARQL query on a triple table is $O(nc)$, where c is the amount of columns that are being queried. Nevertheless, the invention can avoid the $O(nc)$ complexity and bring it down to linear $O(n)$. The SPARQL query gets translated into a SQL query that is posed on the tripleView. However, this tripleView is not alone, like in the case of triple stores implemented as triple-tables. The invention has the advantage that the relational schema exists, and the query optimizer generates queries that are executed on the relational schema. The advantage of the query optimizer generating queries is that it would be compiling out the self joins.

Simple URI Substitution:

The concept of globally unique identifiers is fundamental to OWL ontologies and that these take the form of URIs is required by RDF standard specification. Per the standard, a URI acts as a web-wide unique key for a string or concept. Each class or property in the ontology must have a unique identifier, or URI. While it is possible to use the names from the relational schema to label the concepts in the ontology, it is necessary to resolve any duplications, either by producing URIs based on fully qualified names of schema elements, or by producing them randomly. In addition for human readability, RDFS labels should be produced for each ontology element containing names of corresponding relational schema elements. In one embodiment the transformation rules combine with a set of URI creation rules. Further, the URI creation rules may integrate a dictionary of fixed strings. In one embodiment the fixed strings may be specified by a user and, for example, comprise the domain name of the database server. In another embodiment a user may use a GUI (graphical user interface) or a process may methodically examine each string derived from the database schema, determine its uniqueness and/or replace it from a list of unique strings defined a priori. In yet another embodiment, these methods may be combined by applying each one and concatenating the results.

For example, the SPARQL query and the corresponding SQL query in FIG. 8 are presented using human friendly strings. In one embodiment the domain model generator 103 may place strings and concatenation operators to create URIs in the tripleView and the SQL query engine itself will produce the correct SPARQL RDF result 106. FIG. 10(a) illustrates a fragment of a SQL create view command where the embodiment relies on SQL post-processing 206 to form URIs. FIG. 10(b) illustrates a fragment of a SQL create view command embodying the SQL query engine implements the creation of the required RDF, URI syntax.

Another embodiment of SQL post-processing 206 to form URIs, may be used. Most triple stores implemented as triple tables do not store strings in the triple table. Instead, they store keys or hash values in the triple. These keys are then mapped to a look up table, like a dictionary. In this other embodiment, the dictionary of replacement strings that is defined concomitant with the synthesized domain model, is used by the post-processor to emit the correct URI. In a further extension of this embodiment, if the user is not satisfied with the judgment to fill in the gap between the domain semantics captured, it is still possible to add missing semantics using techniques based on other wrapper-based approaches.

Optimizations:

Upon succeeding in wrapping a database and reviewing query plans, two relational database optimizations are important for effective execution of SPARQL queries: (1) detection of unsatisfiable conditions and (2) self-join elimination. These two optimizations are among semantic query optimization (SQO) methods known in the art. In SQO, the objective is to leverage the semantics, represented in integrity constraints, for query optimization. The basic idea is to use integrity constraints to rewrite a query into a semantically equivalent one and eliminate contradictions.

Figure 12:
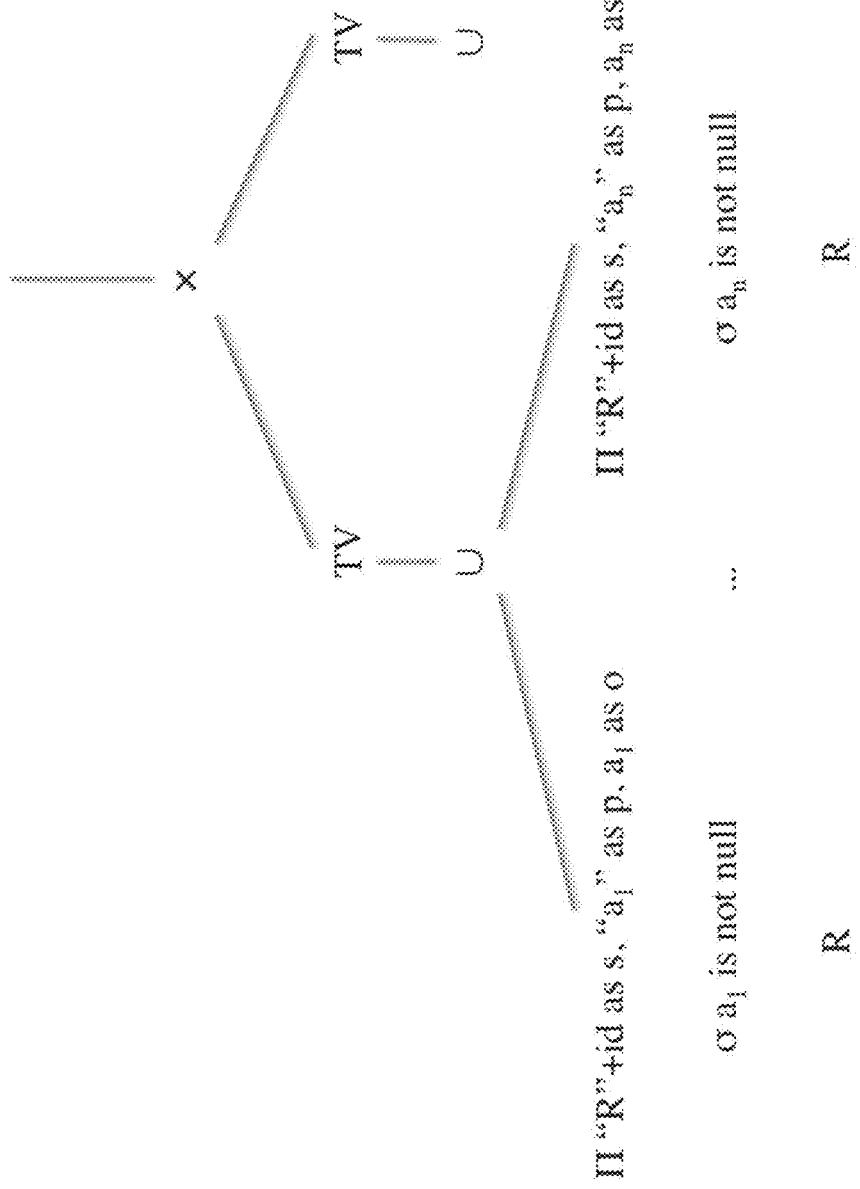
FIG. 12. Initial logical query plan.

Consider the following SPARQL query:
SELECT ?label ?pnum1
WHERE{?x label ?label.
?x pnum1 ?pnum1.}
Which gets translated into the following SQL query on the TripleView:
SELECT t1.o AS label, t2.o AS pnum1
FROM tripleview_varchar t1, tripleview_int t2
WHERE t1.p='label' AND t2.p='pnum1' AND t1.spk=t2.spk FIG. 12 shows the logical query plan. In this query plan, for each of the triple patterns in the query, the TripleView is accessed which is consequently a union of all the SFW statements.

Detection of Unsatisfiable Conditions

The idea of this optimization is to determine that the query result will be empty if the existence of another answer would violate some integrity constraint in the database. This would imply that the answer to the query is null and therefore the database does not need to be accessed. The invention benefits from this optimization by two different transformations, which are referred to as elimination by contradiction and unnecessary union sub-tree pruning.

Elimination by Contradiction: In the inventions TripleView, the constant value of a SFW statement acts as the integrity constraint. Consider the following TripleView:
CREATE VIEW TripleView_varchar(s,spk,p,o,opk) AS
SELECT 'Person'+id as s, id as spk, 'name' as p, name as o, null as opk FROM Person WHERE name IS NOT NULL
UNION ALL
SELECT 'Product'+id as s, id as spk, 'label' as p, label as o, null as opk FROM Product WHERE label IS NOT NULL The first SFW statement has a constant predicate value name while the second SFW statement has a constant predicate value label. Now consider the following query "return all labels of Products":
SELECT o FROM TripleView_varchar WHERE p='label'

The first SFW statement defines p=name to every single query while the query contains p=label. With this contradiction, this particular SFW statement can be substituted by the empty set. The transformation is as follows:
T and contradiction(T) ☐ { }

Unnecessary Union Sub-tree Pruning: Since the TripleView definitions include all possible columns, any specific SPARQL query will only need a small subset of the statements defined in the view. Once the elimination by contradiction transformation happens, all the unnecessary UNION ALL conditions are removed. For example:
UNION ALL ({ }, T)=T
UNION ALL ({ }, S, T)=UNION ALL (S, T)

Figure 13:
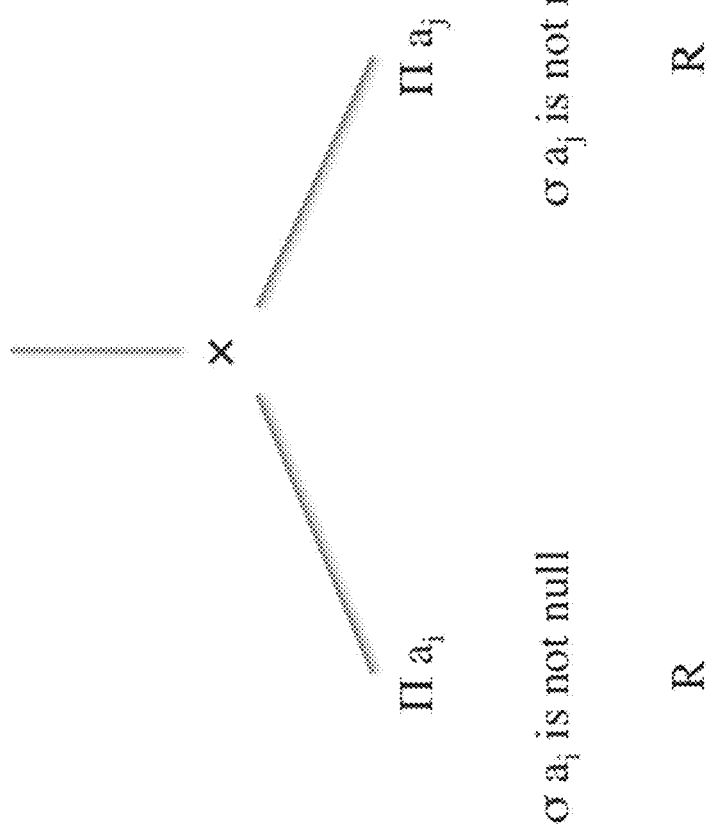
FIG. 13. Logical query plan after Detection of Unsatisfiable Conditions optimization.

When these two transformations are combined, the unreferenced portions of each view definition can reduce the TripleView to the specific subset of referenced columns in a manner that is very similar to standard On-Line Transaction Processing (OLTP) queries. These queries are well supported by existing commercial optimizers. With this optimization, the query plan in FIG. 12 is optimized from having the entire TripleView to just the exact SFW statements that are needed, as shown in FIG. 13.

Self-Join Elimination

Join elimination is one of the several SQO techniques, where integrity constraints are used to eliminate a literal clause in the query. This implies that a join could also be eliminated if the table that is being dropped does not contribute any attributes in the results. The type of join elimination that is desired is the self-join elimination, where a join occurs between the same tables. There are two different cases: self-join elimination of attributes and self-join elimination of selections.

Self-join elimination of projection: This occurs when attributes from the same table are projected individually and then joined together. For example, the following un-optimized query projects the attributes label and pnum1 from the table product where id=1, however each attribute projection is done separately and then joined:
SELECT p1.label, p2.pnum1 FROM product p1, product p2 WHERE p1.id=1 and p1.id=p2.id Given a self-join elimination optimization, the previous query should be rewritten to:
SELECT label, pnum1 FROM product WHERE id=1

Self-join elimination of selection: This occurs when a selection on attributes from the same table are done individually and then joined together. For example, the following un-optimized query selects on pnum1>100 and pnum2<500 separately and then joined:
SELECT p1.id FROM product p1, product p2 WHERE p1.pnum1>100 and p2.pnum2<500 and p1.id=p2. id Given a self-join elimination optimization, the previous query should be rewritten to:
SELECT id FROM product WHERE pnum1>100 and pnum2<500

FIG. 14 shows the final query plan after the self-joins are removed.

Operating Environment:

The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention. Further, the user's computer may be a laptop or desktop type of personal computer. It can also be a cell phone, smart phone or other handheld device. The precise form factor of the user's computer does not limit the claimed invention. In one embodiment, the user's computer is omitted, and instead a separate computing functionality provided that works with the central server. This may be housed in the central server or operatively connected to it. In this case, an operator can take a telephone call from a customer and input into the computing system the customer's data in accordance with the disclosed method. Further, the user may receive from and transmit data to the central server by means of the Internet, whereby the user accesses an account using an Internet web-browser and browser displays an interactive web page operatively connected to the central server. The central server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the web site can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like. The computer can operate a program that receives from a remote server a data file that is passed to a program that interprets the data in the data file and commands the display device to present particular text, images, video, audio and other objects. The program can detect the relative location of the cursor when the mouse button is actuated, and interpret a command to be executed based on location on the indicated relative location on the display when the button was pressed. The data file may be an HTML document, the program a web-browser program and the command a hyper-link that causes the browser to request a new HTML document from another remote data network address location.

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, the relational database may be housed in one or more operatively connected servers operatively connected to computer memory, for example, disk drives. The invention may be executed on another computer that is presenting a user a semantic web representation of available data. That second computer can execute the invention by communicating with the set of servers that house the relational database. In yet another embodiment, the initialization of the relational database may be prepared on the set of servers and the interaction with the user's computer occur at a different place in the overall process.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

The invention claimed is:

1. A system comprised of one or more computers for executing a digitally encoded first query that is expressed in a query language operable on a first type of data organization, on the data contents of a pre-existing data set in a second type of data organization comprised of a corresponding data organization schema encoded in a schema data file, said system comprising:
 a computer memory comprised of stored data encoding the first query;
 a translating module comprised of logic configured to automatically translate the stored first query into a digitally encoded second query expressed in a query language compatible with the second data organization type by using a mapping data structure stored in a computer memory comprising said system, said data structure embodying a synthetic domain model representation of the second data organization schema derived from the schema data file, in order to create the second query; and
 a system comprised of the pre-existing data set of the second organization type configured by logic to execute the second query on the pre-existing data set.

2. A method executed by a computer system comprised of one or more computers, for executing a digitally encoded first query that is expressed in a query language operable on a first type of data organization, on the data contents of a pre-existing data set in a second type of data organization comprised of a corresponding data organization schema encoded in a schema data file, said method comprising:
 retrieving from a data storage device data encoding the first query, said first query being expressed in a query language operable on the first type of data organization;
 automatically translating the first query into a second digitally encoded translated query expressed in a query language compatible with the second type of data organization by using a mapping data structure stored in a computer memory comprising said computer system, said data structure embodying a synthetic domain model representation of the second type of data organization in order to create a data object representing the second translated query; and
 executing the second query on the pre-existing data set of the second type of data organization.

3. A computer readable storage device comprised of data representing computer instructions that when executed perform the steps of:
 executing a digitally encoded first query that is expressed in a query language operable on a first type of data organization, on the data contents of a pre-existing data set in a second type of data organization comprised of a corresponding data organization schema encoded in a schema data file, by:
 retrieving from a data storage device data encoding the first query, said first query being expressed in a query language operable on the first type of data organization;
 automatically translating the first query into a second digitally encoded translated query expressed in a query language compatible with the second type of data organization by using a mapping data structure stored in a computer memory comprising said computer system, said data structure embodying a synthetic domain model representation of the second type of data organization in order to create a data object representing the second translated query; and
 executing the second query on the pre-existing data set of the second type of data organization.

* * * * *